(12) United States Patent
Heo et al.

(10) Patent No.: US 10,372,322 B2
(45) Date of Patent: Aug. 6, 2019

(54) MOBILE TERMINAL AND METHOD FOR CONTROLLING THE SAME

(71) Applicant: LG ELECTRONICS INC., Seoul (KR)

(72) Inventors: Jeongyun Heo, Seoul (KR); Shinnyue Kang, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 311 days.

(21) Appl. No.: 15/341,800

(22) Filed: Nov. 2, 2016

(65) Prior Publication Data

US 2017/0336961 A1  Nov. 23, 2017

(30) Foreign Application Priority Data

May 20, 2016 (KR) ........................ 10-2016-0062323

(51) Int. Cl.
| | |
|---|---|
| *G06F 3/0484* | (2013.01) |
| *G06F 3/0488* | (2013.01) |
| *G06F 3/0481* | (2013.01) |
| *G06F 3/0482* | (2013.01) |
| *G06F 3/0485* | (2013.01) |

(Continued)

(52) U.S. Cl.
CPC ........ *G06F 3/04883* (2013.01); *G06F 3/0482* (2013.01); *G06F 3/0485* (2013.01); *G06F 3/04817* (2013.01); *G06F 3/04845* (2013.01); *G06F 3/04847* (2013.01); *G11B 27/105* (2013.01); *G11B 27/34* (2013.01); *H04N 21/41407* (2013.01); *H04N 21/42222* (2013.01); *H04N 21/4325* (2013.01); *H04N 21/47205* (2013.01); *H04N 21/47217* (2013.01)

(58) Field of Classification Search
CPC combination set(s) only.
See application file for complete search history.

(56) References Cited

U.S. PATENT DOCUMENTS

| | | | | |
|---|---|---|---|---|
| 7,986,819 | B2 * | 7/2011 | Momosaki | ........ G06F 17/30247 382/118 |
| 2009/0089822 | A1 * | 4/2009 | Wada | ................ G06F 17/30781 725/10 |

(Continued)

FOREIGN PATENT DOCUMENTS

| | | |
|---|---|---|
| EP | 2434380 A1 | 3/2012 |
| EP | 2672686 A2 | 12/2013 |
| EP | 2860734 A1 | 4/2015 |

*Primary Examiner* — Hien L Duong
(74) *Attorney, Agent, or Firm* — Birch, Stewart, Kolasch & Birch, LLP

(57) ABSTRACT

A mobile terminal including a wireless processor configured to provide wireless communication; a touch screen; and a controller configured to display a search bar on the touch screen for searching a video and a specific time point of the video, in response to a first touch input at a touch region of the search bar, display a preview image at a play time point corresponding to the touch region of the search bar, convert the preview image into a plurality of preview images at a plurality of play time points in response to a changed touch degree of the first touch input, and in response to a second touch input being consecutively applied to the search bar when the preview images are displayed, change a play speed of at least part of the preview images at a play time point.

18 Claims, 22 Drawing Sheets

(51) Int. Cl.
*G11B 27/10* (2006.01)
*G11B 27/34* (2006.01)
*H04N 21/414* (2011.01)
*H04N 21/422* (2011.01)
*H04N 21/432* (2011.01)
*H04N 21/472* (2011.01)

(56) References Cited

U.S. PATENT DOCUMENTS

| | | | | |
|---|---|---|---|---|
| 2010/0231537 A1* | 9/2010 | Pisula | ............... | G06F 3/0481 345/173 |
| 2010/0259645 A1* | 10/2010 | Kaplan | ............... | G11B 27/034 348/231.99 |
| 2012/0274662 A1* | 11/2012 | Kim | ............... | G06F 3/0488 345/650 |
| 2013/0227414 A1* | 8/2013 | Hwang | ............... | G06F 3/0485 715/719 |
| 2013/0324192 A1* | 12/2013 | Lee | ............... | H04M 1/0266 455/557 |
| 2013/0332836 A1 | 12/2013 | Cho | | |
| 2014/0169765 A1 | 6/2014 | Wang et al. | | |
| 2015/0016801 A1* | 1/2015 | Homma | ............... | G06F 3/0485 386/243 |
| 2015/0019969 A1* | 1/2015 | Lee | ............... | G06F 3/04842 715/719 |
| 2015/0058723 A1* | 2/2015 | Cieplinski | ............... | G06F 3/04855 715/702 |
| 2015/0067513 A1* | 3/2015 | Zambetti | ............... | G06F 3/0482 715/716 |
| 2015/0177903 A1* | 6/2015 | Kim | ............... | G06F 3/03545 345/156 |
| 2015/0177933 A1* | 6/2015 | Cueto | ............... | G06F 3/0483 715/776 |
| 2015/0194186 A1* | 7/2015 | Lee | ............... | H04N 5/772 386/224 |
| 2015/0325271 A1* | 11/2015 | Kim | ............... | G11B 27/11 386/230 |
| 2015/0346984 A1* | 12/2015 | Flint | ............... | G06F 3/04847 715/720 |
| 2016/0259412 A1* | 9/2016 | Flint | ............... | G06F 3/0488 |
| 2017/0046059 A1* | 2/2017 | Karunannuni | ............... | G06F 3/0488 |
| 2017/0244959 A1* | 8/2017 | Ranjeet | ............... | G08B 13/19641 |
| 2017/0330600 A1* | 11/2017 | Aliverti | ............... | H04N 9/79 |

* cited by examiner

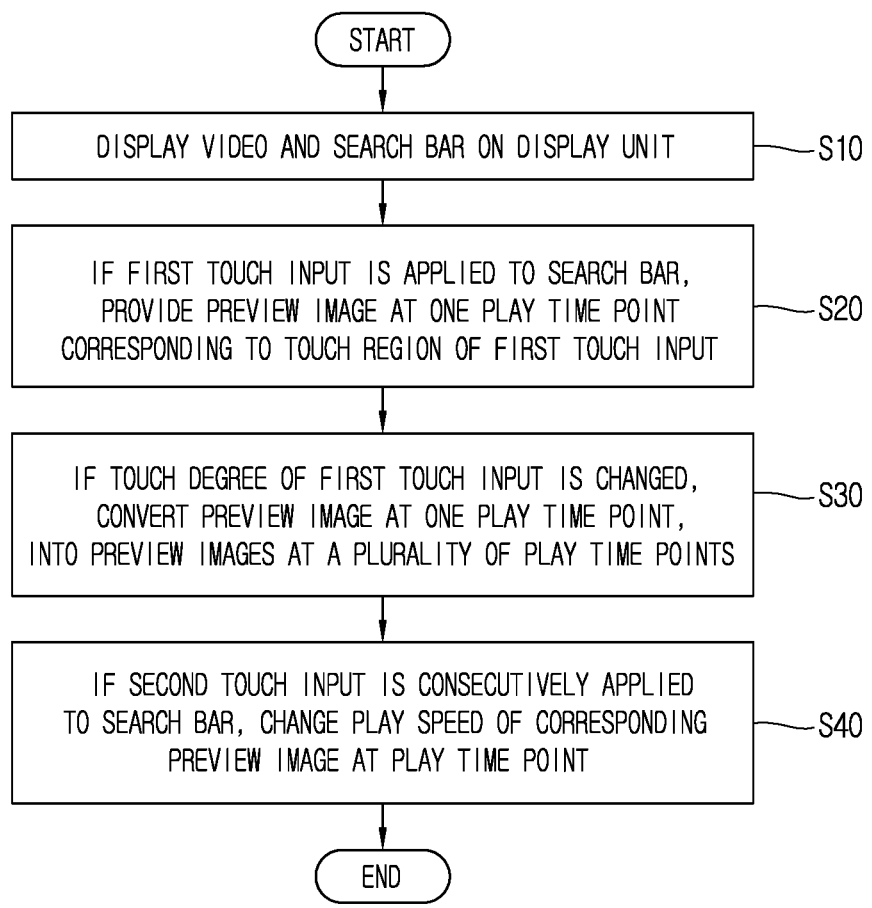

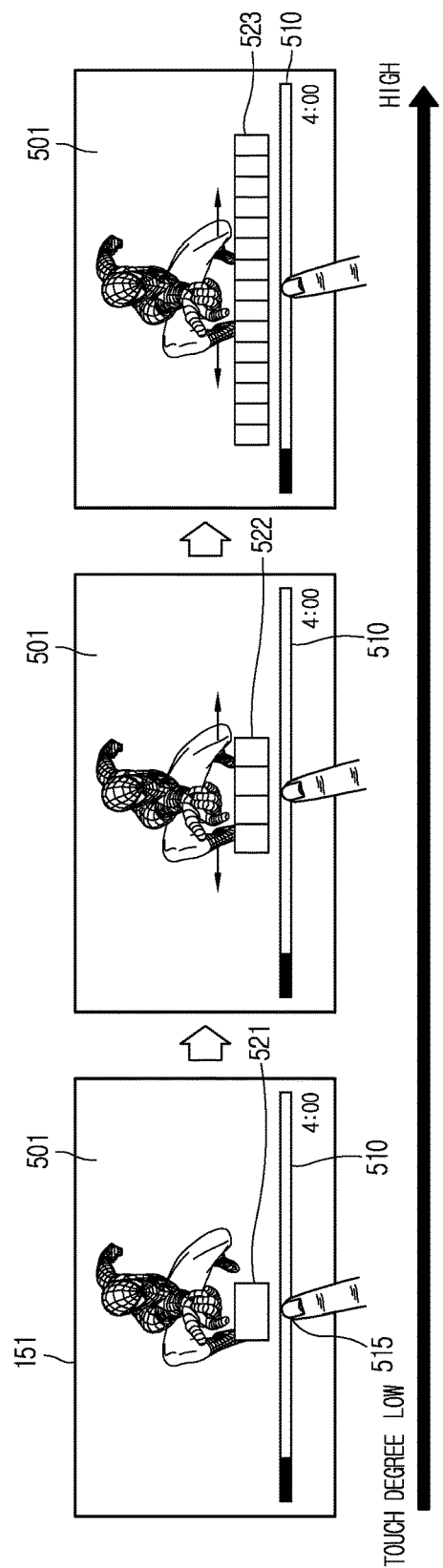

FIG. 6C
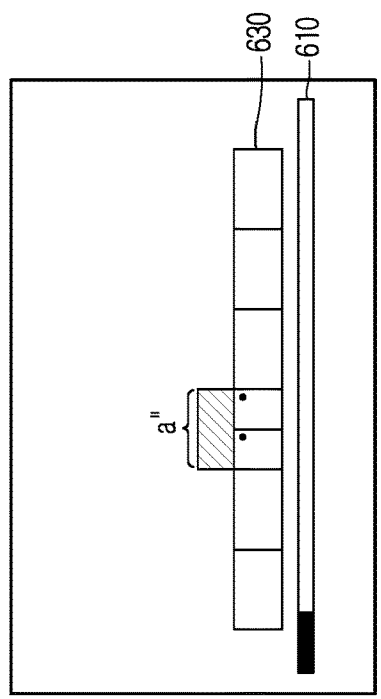
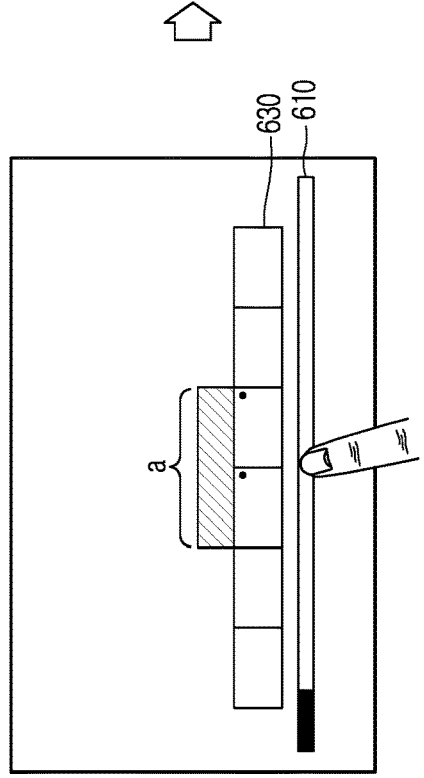

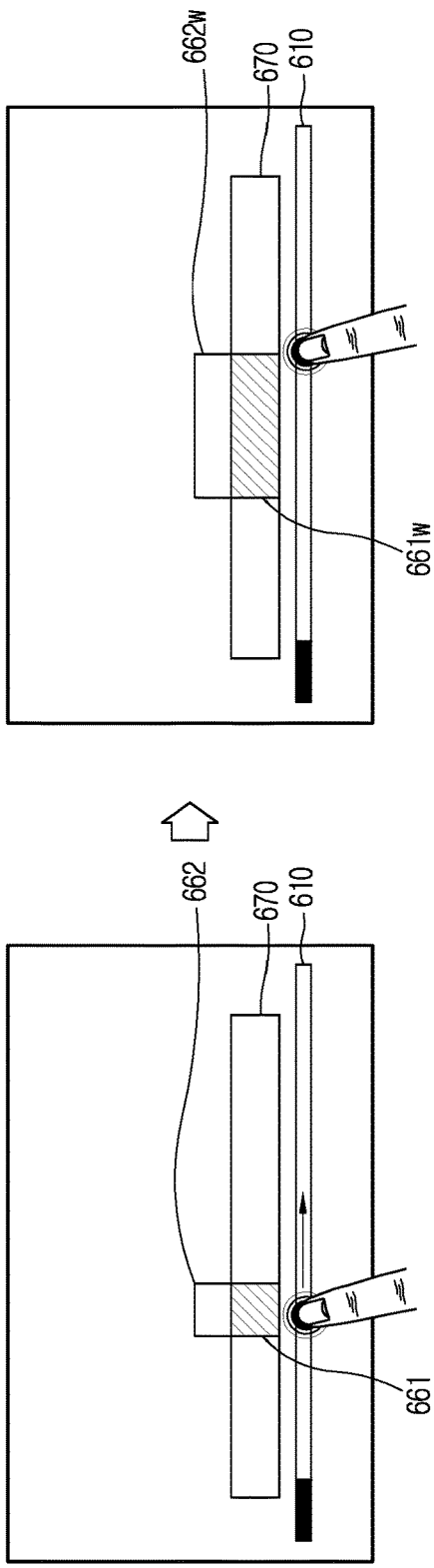

FIG. 7A
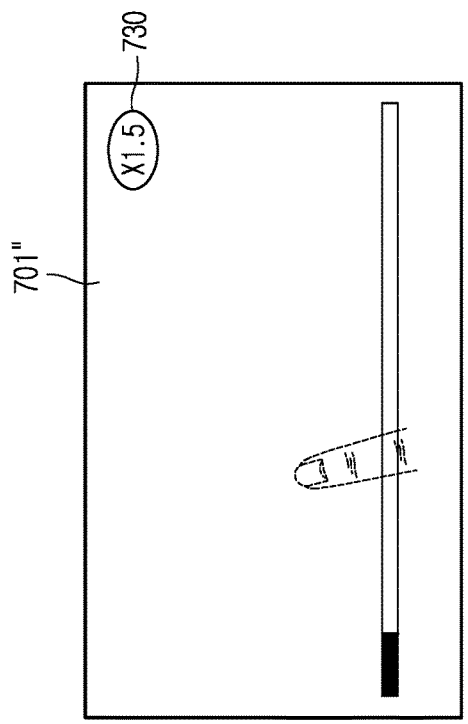
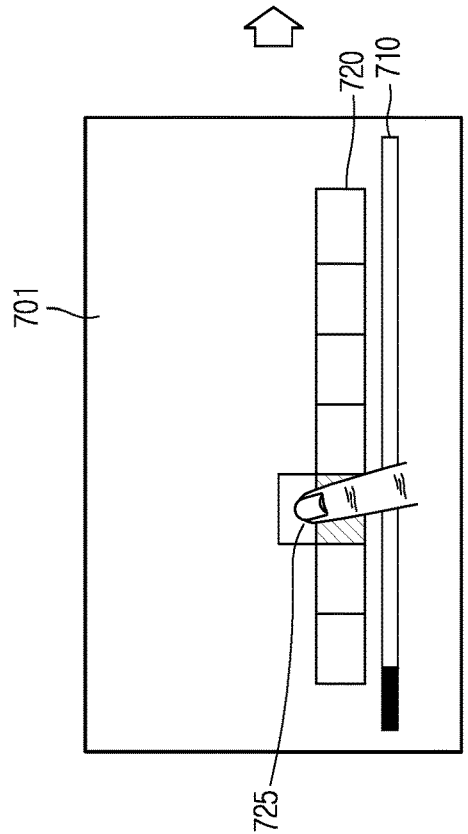

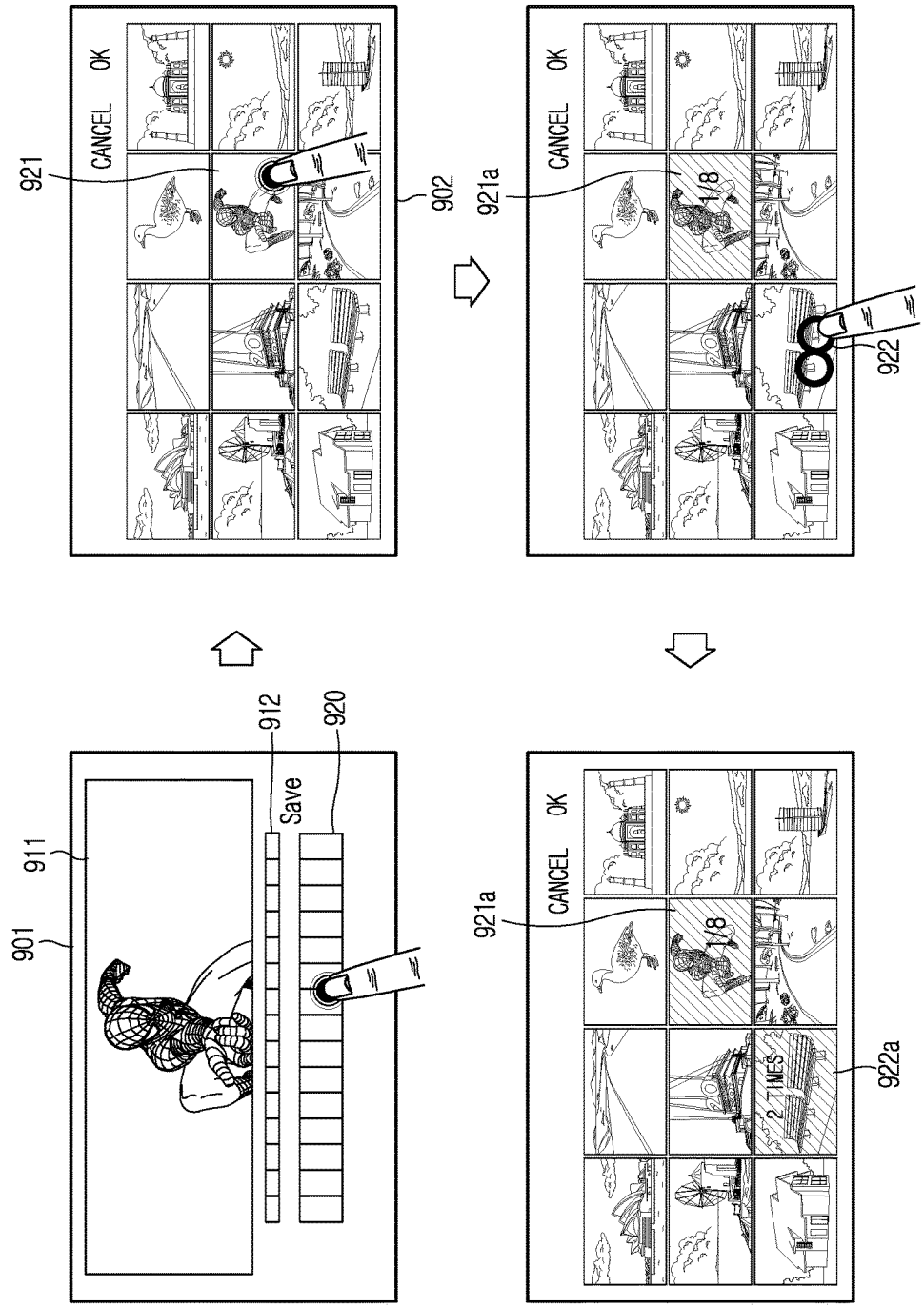

MOBILE TERMINAL AND METHOD FOR CONTROLLING THE SAME

CROSS-REFERENCE TO THE RELATED APPLICATION

Pursuant to 35 U.S.C. § 119(a), this application claims the benefit of an earlier filing date of and the right of priority to Korean Application No. 10-2016-0062323, filed on May 20, 2016, the contents of which are incorporated by reference herein in their entirety.

BACKGROUND OF THE INVENTION

1. Field of the Invention

This specification relates to a mobile terminal, and more particularly, to a mobile terminal having a touch screen and a method for controlling the same.

2. Background of the Invention

Terminals may be generally classified as mobile/portable terminals or stationary terminals. Mobile terminals may also be classified as handheld terminals or vehicle mounted terminals.

Mobile terminals have become increasingly more functional. Examples of such functions include data and voice communications, capturing images and video through a camera, recording audio, playing music files through a speaker system, and displaying images and video on a display unit. Some mobile terminals additionally provide functions such as playing an electronic game, or executing a function of multimedia players. Especially, recent mobile terminals may receive multicast signal for providing visual content such as broadcasts, videos, or television programs.

As it becomes multifunctional, a mobile terminal can capture still images or moving images, play music or video files, play games, receive broadcast and the like, so as to be implemented as an integrated multimedia player. As an example of such functions, a video image can be played on a display unit of the mobile terminal, or a preview image being recorded by a camera can be displayed. In this instance, in order to search a specific scene while the video image is being played, a user should check a plurality of scenes one by one by moving to a corresponding play time point using a control bar, etc. This causes user's inconvenience.

SUMMARY OF THE INVENTION

Therefore, an aspect of the detailed description is to provide a mobile terminal capable of checking scenes corresponding to a plurality of play time points at a time, in searching a specific scene while a video image is being played, and a method for controlling the same.

Another aspect of the detailed description is to provide a mobile terminal capable of controlling a play speed at a specific play time point/section or at a plurality of play time points/sections while a video is being played.

To achieve these and other advantages and in accordance with the purpose of this specification, as embodied and broadly described herein, there is provided a mobile terminal, including: a wireless processor configured to provide wireless communication; a touch screen; and a controller configured to: display a search bar on the touch screen for searching a video and a specific time point of the video, in response to a first touch input at a touch region of the search bar, display a preview image at a play time point corresponding to the touch region of the search bar, convert the preview image into a plurality of preview images at a plurality of play time points in response to a changed touch degree of the first touch input, and in response to a second touch input being consecutively applied to the search bar when the preview images are displayed, change a play speed of at least part of the preview images at a play time point.

Further scope of applicability of the present application will become more apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from the detailed description.

BRIEF DESCRIPTION OF THE DRAWINGS

The accompanying drawings, which are included to provide a further understanding of the invention and are incorporated in and constitute a part of this specification, illustrate exemplary embodiments and together with the description serve to explain the principles of the invention.

In the drawings:

FIG. 4 is a flowchart illustrating the operation of FIG. 3;

FIGS. 5A and 5B, 6A to 6F, 7A and 7B, 8A and 8B, and 9 illustrate various examples to change a play speed of a video at a specific time point, based on a touch degree of a touch input, in a mobile terminal according to an embodiment of the present invention;

DETAILED DESCRIPTION OF THE EMBODIMENTS

Description will now be given in detail according to exemplary embodiments disclosed herein, with reference to the accompanying drawings. For the sake of brief description with reference to the drawings, the same or equivalent components may be provided with the same or similar reference numbers, and description thereof will not be repeated. In general, a suffix such as "module" and "unit" may be used to refer to elements or components. Use of such a suffix herein is merely intended to facilitate description of the specification, and the suffix itself is not intended to give any special meaning or function. The accompanying drawings are used to help easily understand various technical features and it should be understood that the embodiments presented herein are not limited by the accompanying drawings. As such, the present disclosure should be construed to extend to any alterations, equivalents and substitutes in addition to those which are particularly set out in the accompanying drawings.

Although the terms first, second, etc. may be used herein to describe various elements, these elements should not be limited by these terms. These terms are generally only used to distinguish one element from another.

When an element is referred to as being "connected with" another element, the element can be connected with the other element or intervening elements may also be present. In contrast, when an element is referred to as being "directly connected with" another element, there are no intervening elements present.

A singular representation may include a plural representation unless it represents a definitely different meaning from the context. Terms such as "include" or "has" are used herein and should be understood that they are intended to indicate an existence of several components, functions or steps, disclosed in the specification, and it is also understood that greater or fewer components, functions, or steps may likewise be utilized.

Mobile terminals presented herein may be implemented using a variety of different types of terminals. Examples of such terminals include cellular phones, smart phones, user equipment, laptop computers, digital broadcast terminals, personal digital assistants (PDAs), portable multimedia players (PMPs), navigators, portable computers (PCs), slate PCs, tablet PCs, ultra books, wearable devices (for example, smart glasses), head mounted displays (HMDs), and the like.

By way of non-limiting example only, further description will be made with reference to particular types of mobile terminals. However, such teachings apply equally to other types of terminals, such as those types noted above. In addition, these teachings may also be applied to stationary terminals such as digital TV, desktop computers, and a digital signage.

Figure 1A:
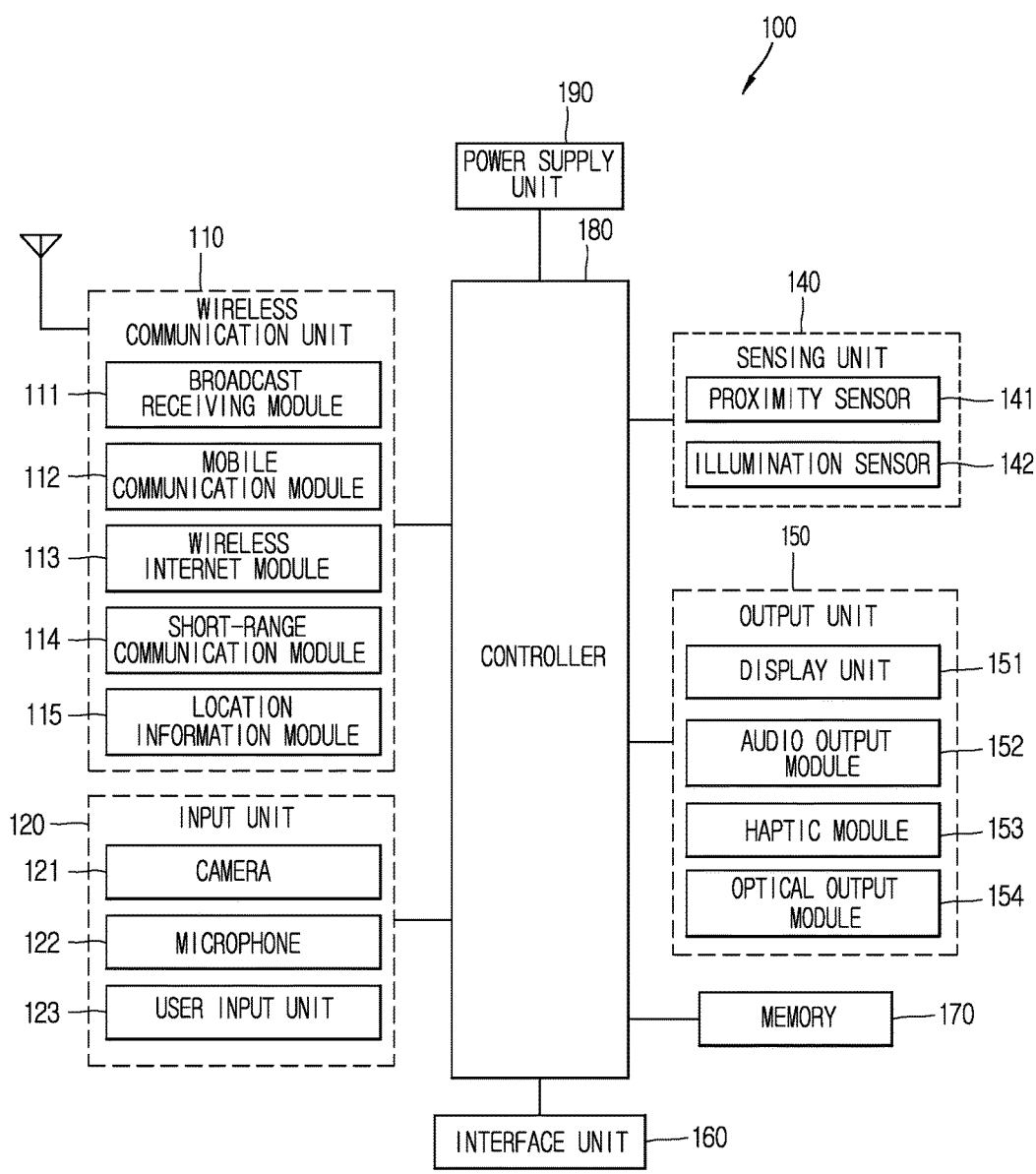
FIG. 1A is a block diagram of a mobile terminal according to an embodiment of the present invention.
Figure 1B:
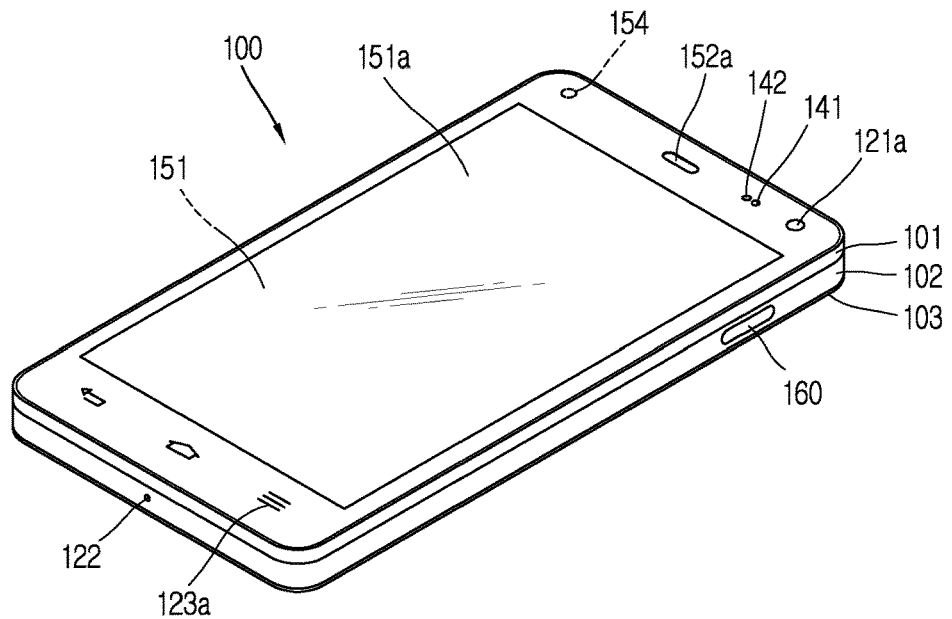
FIGS. 1B and 1C are conceptual views of one example of a mobile terminal according to an embodiment of the present invention, which are viewed from different directions.
Figure 1C:
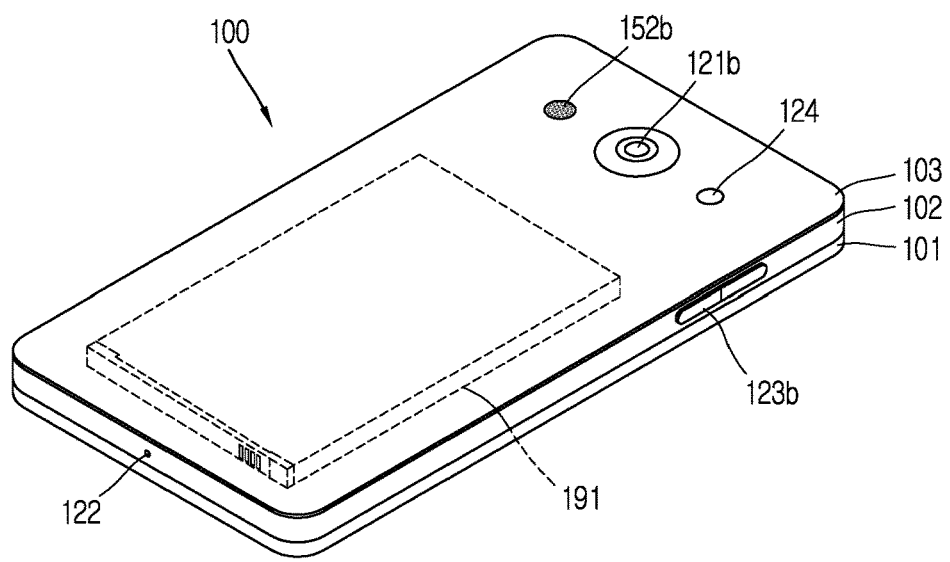

Reference is now made to FIGS. 1A-1C, where FIG. 1A is a block diagram of a mobile terminal in accordance with the present disclosure, and FIGS. 1B and 1C are conceptual views of one example of the mobile terminal, viewed from different directions.

The mobile terminal 100 is shown having components such as a wireless communication unit 110, an input unit 120, a sensing unit 140, an output unit 150, an interface unit 160, a memory 170, a controller 180, and a power supply unit 190. Implementing all of the illustrated components of FIG. 1A is not a requirement, and that greater or fewer components may alternatively be implemented.

Referring now to FIG. 1A, the wireless communication unit 110 typically includes one or more modules which permit communications such as wireless communications between the mobile terminal 100 and a wireless communication system, communications between the mobile terminal 100 and another mobile terminal, communications between the mobile terminal 100 and an external server. Further, the wireless communication unit 110 typically includes one or more modules which connect the mobile terminal 100 to one or more networks.

To facilitate such communications, the wireless communication unit 110 includes one or more of a broadcast receiving module 111, a mobile communication module 112, a wireless Internet module 113, a short-range communication module 114, and a location information module 115.

The input unit 120 includes a camera 121 for obtaining images or video, a microphone 122, which is one type of audio input device for inputting an audio signal, and a user input unit 123 (for example, a touch key, a push key, a mechanical key, a soft key, and the like) for allowing a user to input information. Data (for example, audio, video, image, and the like) is obtained by the input unit 120 and may be analyzed and processed by controller 180 according to device parameters, user commands, and combinations thereof.

The sensing unit 140 is typically implemented using one or more sensors configured to sense internal information of the mobile terminal, the surrounding environment of the mobile terminal, user information, and the like. For example, in FIG. 1A, the sensing unit 140 is shown having a proximity sensor 141 and an illumination sensor 142. If desired, the sensing unit 140 may alternatively or additionally include other types of sensors or devices, such as a touch sensor, an acceleration sensor, a magnetic sensor, a G-sensor, a gyroscope sensor, a motion sensor, an RGB sensor, an infrared (IR) sensor, a finger scan sensor, a ultrasonic sensor, an optical sensor (for example, camera 121), a microphone 122, a battery gauge, an environment sensor (for example, a barometer, a hygrometer, a thermometer, a radiation detection sensor, a thermal sensor, and a gas sensor, among others), and a chemical sensor (for example, an electronic nose, a health care sensor, a biometric sensor, and the like), to name a few.

The output unit 150 is typically configured to output various types of information, such as audio, video, tactile output, and the like. The output unit 150 is shown having a display unit 151, an audio output module 152, a haptic module 153, and an optical output module 154. The display unit 151 may have an inter-layered structure or an integrated structure with a touch sensor in order to facilitate a touch screen. The touch screen may provide an output interface between the mobile terminal 100 and a user, as well as function as the user input unit 123 which provides an input interface between the mobile terminal 100 and the user.

The interface unit 160 serves as an interface with various types of external devices that can be coupled to the mobile terminal 100. The interface unit 160, for example, may include any of wired or wireless ports, external power supply ports, wired or wireless data ports, memory card ports, ports for connecting a device having an identification module, audio input/output (I/O) ports, video I/O ports, earphone ports, and the like. In some cases, the mobile terminal 100 may perform assorted control functions associated with a connected external device, in response to the external device being connected to the interface unit 160.

The memory 170 is typically implemented to store data to support various functions or features of the mobile terminal 100. For instance, the memory 170 may be configured to store application programs executed in the mobile terminal 100, data or instructions for operations of the mobile terminal 100, and the like. Some of these application programs may be downloaded from an external server via wireless communication. Other application programs may be installed within the mobile terminal 100 at time of manufacturing or shipping, which is typically the case for basic functions of the mobile terminal 100 (for example, receiving a call, placing a call, receiving a message, sending a message, and the like). It is common for application programs to be stored in the memory 170, installed in the mobile terminal 100, and executed by the controller 180 to perform an operation (or function) for the mobile terminal 100.

The controller 180 typically functions to control overall operation of the mobile terminal 100, in addition to the operations associated with the application programs. The controller 180 can provide or process information or functions appropriate for a user by processing signals, data, information and the like, which are input or output by the various components depicted in FIG. 1A, or activating application programs stored in the memory 170. As one example, the controller 180 controls some or all of the components illustrated in FIGS. 1A-1C according to the execution of an application program that have been stored in the memory 170.

The power supply unit 190 can be configured to receive external power or provide internal power in order to supply appropriate power required for operating elements and components included in the mobile terminal 100. The power supply unit 190 may include a battery, and the battery may be configured to be embedded in the terminal body, or configured to be detachable from the terminal body.

Referring still to FIG. 1A, various components depicted in this figure will now be described in more detail. Regarding the wireless communication unit 110, the broadcast receiving module 111 is typically configured to receive a broadcast signal and/or broadcast associated information from an external broadcast managing entity via a broadcast channel. The broadcast channel may include a satellite channel, a terrestrial channel, or both. In some embodiments, two or more broadcast receiving modules 111 may be utilized to facilitate simultaneously receiving of two or more broadcast channels, or to support switching among broadcast channels.

The mobile communication module 112 can transmit and/or receive wireless signals to and from one or more network entities. Typical examples of a network entity include a base station, an external mobile terminal, a server, and the like. Such network entities form part of a mobile communication network, which is constructed according to technical standards or communication methods for mobile communications (for example, Global System for Mobile Communication (GSM), Code Division Multi Access (CDMA), Wideband CDMA (WCDMA), High Speed Downlink Packet access (HSDPA), Long Term Evolution (LTE), and the like).

Examples of wireless signals transmitted and/or received via the mobile communication module 112 include audio call signals, video (telephony) call signals, or various formats of data to support communication of text and multimedia messages. The wireless Internet module 113 is configured to facilitate wireless Internet access. This module may be internally or externally coupled to the mobile terminal 100. The wireless Internet module 113 may transmit and/or receive wireless signals via communication networks according to wireless Internet technologies.

Examples of such wireless Internet access include Wireless LAN (WLAN), Wireless Fidelity (Wi-Fi), Wi-Fi Direct, Digital Living Network Alliance (DLNA), Wireless Broadband (WiBro), Worldwide Interoperability for Microwave Access (WiMAX), High Speed Downlink Packet Access (HSDPA), HSUPA (High Speed Uplink Packet Access), Long Term Evolution (LTE), LTE-A (Long Term Evolution-Advanced), and the like. The wireless Internet module 113 may transmit/receive data according to one or more of such wireless Internet technologies, and other Internet technologies as well.

In some embodiments, when the wireless Internet access is implemented according to, for example, WiBro, HSDPA, GSM, CDMA, WCDMA, LTE and the like, as part of a mobile communication network, the wireless Internet module 113 performs such wireless Internet access. As such, the Internet module 113 may cooperate with, or function as, the mobile communication module 112.

The short-range communication module 114 is configured to facilitate short-range communications. Suitable technologies for implementing such short-range communications include BLUETOOTH™, Radio Frequency IDentification (RFID), Infrared Data Association (IrDA), Ultra-WideBand (UWB), ZigBee, Near Field Communication (NFC), Wireless-Fidelity (Wi-Fi), Wi-Fi Direct, Wireless USB (Wireless Universal Serial Bus), and the like. The short-range communication module 114 in general supports wireless communications between the mobile terminal 100 and a wireless communication system, communications between the mobile terminal 100 and another mobile terminal 100, or communications between the mobile terminal and a network where another mobile terminal 100 (or an external server) is located, via wireless area networks. One example of the wireless area networks is a wireless personal area networks.

In some embodiments, another mobile terminal (which may be configured similarly to mobile terminal 100) may be a wearable device, for example, a smart watch, a smart glass or a head mounted display (HMD), which can exchange data with the mobile terminal 100 (or otherwise cooperate with the mobile terminal 100). The short-range communication module 114 may sense or recognize the wearable device, and permit communication between the wearable device and the mobile terminal 100. In addition, when the sensed wearable device is a device which is authenticated to communicate with the mobile terminal 100, the controller 180, for example, may cause transmission of data processed in the mobile terminal 100 to the wearable device via the short-range communication module 114. Hence, a user of the wearable device may use the data processed in the mobile terminal 100 on the wearable device. For example, when a call is received in the mobile terminal 100, the user can answer the call using the wearable device. Also, when a message is received in the mobile terminal 100, the user can check the received message using the wearable device.

The location information module 115 is generally configured to detect, calculate, derive or otherwise identify a position of the mobile terminal. As an example, the location information module 115 includes a Global Position System (GPS) module, a Wi-Fi module, or both. If desired, the location information module 115 may alternatively or additionally function with any of the other modules of the wireless communication unit 110 to obtain data related to the position of the mobile terminal.

As one example, when the mobile terminal uses a GPS module, a position of the mobile terminal may be acquired using a signal sent from a GPS satellite. As another example, when the mobile terminal uses the Wi-Fi module, a position of the mobile terminal can be acquired based on information related to a wireless access point (AP) which transmits or receives a wireless signal to or from the Wi-Fi module.

The input unit 120 may be configured to permit various types of input to the mobile terminal 120. Examples of such input include audio, image, video, data, and user input. Image and video input is often obtained using one or more cameras 121. Such cameras 121 may process image frames of still pictures or video obtained by image sensors in a video or image capture mode. The processed image frames can be displayed on the display unit 151 or stored in memory 170. In some cases, the cameras 121 may be arranged in a matrix configuration to permit a plurality of images having various angles or focal points to be input to the mobile terminal 100. As another example, the cameras 121 may be located in a stereoscopic arrangement to acquire left and right images for implementing a stereoscopic image.

The microphone 122 is generally implemented to permit audio input to the mobile terminal 100. The audio input can be processed in various manners according to a function being executed in the mobile terminal 100. If desired, the microphone 122 may include assorted noise removing algorithms to remove unwanted noise generated in the course of receiving the external audio.

The user input unit 123 is a component that permits input by a user. Such user input may enable the controller 180 to control operation of the mobile terminal 100. The user input unit 123 may include one or more of a mechanical input element (for example, a key, a button located on a front and/or rear surface or a side surface of the mobile terminal 100, a dome switch, a jog wheel, a jog switch, and the like), or a touch-sensitive input, among others. As one example, the touch-sensitive input may be a virtual key or a soft key, which is displayed on a touch screen through software processing, or a touch key which is located on the mobile terminal at a location that is other than the touch screen. Further, the virtual key or the visual key can be displayed on the touch screen in various shapes, for example, graphic, text, icon, video, or a combination thereof.

The sensing unit 140 is generally configured to sense one or more of internal information of the mobile terminal, surrounding environment information of the mobile terminal, user information, or the like. The controller 180 generally cooperates with the sending unit 140 to control operation of the mobile terminal 100 or execute data processing, a function or an operation associated with an application program installed in the mobile terminal based on the sensing provided by the sensing unit 140. The sensing unit 140 may be implemented using any of a variety of sensors, some of which will now be described in more detail.

The proximity sensor 141 may include a sensor to sense presence or absence of an object approaching a surface, or an object located near a surface, by using an electromagnetic field, infrared rays, or the like without a mechanical contact. The proximity sensor 141 may be arranged at an inner region of the mobile terminal covered by the touch screen, or near the touch screen.

The proximity sensor 141, for example, may include any of a transmissive type photoelectric sensor, a direct reflective type photoelectric sensor, a mirror reflective type photoelectric sensor, a high-frequency oscillation proximity sensor, a capacitance type proximity sensor, a magnetic type proximity sensor, an infrared rays proximity sensor, and the like. When the touch screen is implemented as a capacitance type, the proximity sensor 141 can sense proximity of a pointer relative to the touch screen by changes of an electromagnetic field, which is responsive to an approach of an object with conductivity. In this instance, the touch screen (touch sensor) may also be categorized as a proximity sensor.

The term "proximity touch" will often be referred to herein to denote the scenario in which a pointer is positioned to be proximate to the touch screen without contacting the touch screen. The term "contact touch" will often be referred to herein to denote the scenario in which a pointer makes physical contact with the touch screen. For the position corresponding to the proximity touch of the pointer relative to the touch screen, such position will correspond to a position where the pointer is perpendicular to the touch screen. The proximity sensor 141 may sense proximity touch, and proximity touch patterns (for example, distance, direction, speed, time, position, moving status, and the like).

In general, controller 180 processes data corresponding to proximity touches and proximity touch patterns sensed by the proximity sensor 141, and cause output of visual information on the touch screen. In addition, the controller 180 can control the mobile terminal 100 to execute different operations or process different data according to whether a touch with respect to a point on the touch screen is either a proximity touch or a contact touch.

A touch sensor can sense a touch applied to the touch screen, such as display unit 151, using any of a variety of touch methods. Examples of such touch methods include a resistive type, a capacitive type, an infrared type, and a magnetic field type, among others.

As one example, the touch sensor may be configured to convert changes of pressure applied to a specific part of the display unit 151, or convert capacitance occurring at a specific part of the display unit 151, into electric input signals. The touch sensor may also be configured to sense not only a touched position and a touched area, but also touch pressure and/or touch capacitance. A touch object is generally used to apply a touch input to the touch sensor. Examples of typical touch objects include a finger, a touch pen, a stylus pen, a pointer, or the like.

When a touch input is sensed by a touch sensor, corresponding signals may be transmitted to a touch controller. The touch controller may process the received signals, and then transmit corresponding data to the controller 180. Accordingly, the controller 180 can sense which region of the display unit 151 has been touched. Here, the touch controller may be a component separate from the controller 180, the controller 180, and combinations thereof.

In some embodiments, the controller 180 can execute the same or different controls according to a type of touch object that touches the touch screen or a touch key provided in addition to the touch screen. Whether to execute the same or different control according to the object which provides a touch input may be decided based on a current operating state of the mobile terminal 100 or a currently executed application program, for example.

The touch sensor and the proximity sensor may be implemented individually, or in combination, to sense various types of touches. Such touches includes a short (or tap) touch, a long touch, a multi-touch, a drag touch, a flick touch, a pinch-in touch, a pinch-out touch, a swipe touch, a hovering touch, and the like.

If desired, an ultrasonic sensor may be implemented to recognize position information relating to a touch object using ultrasonic waves. The controller 180, for example, may calculate a position of a wave generation source based on information sensed by an illumination sensor and a plurality of ultrasonic sensors. Since light is much faster than ultrasonic waves, the time for which the light reaches the optical sensor is much shorter than the time for which the ultrasonic wave reaches the ultrasonic sensor. The position of the wave generation source may be calculated using this fact. For instance, the position of the wave generation source may be calculated using the time difference from the time that the ultrasonic wave reaches the sensor based on the light as a reference signal.

The camera 121 typically includes at least one a camera sensor (CCD, CMOS etc.), a photo sensor (or image sensors), and a laser sensor. Implementing the camera 121 with a laser sensor allows detection of a touch of a physical object with respect to a 3D stereoscopic image. The photo sensor may be laminated on, or overlapped with, the mobile terminal. The photo sensor may be configured to scan movement of the physical object in proximity to the touch screen.

In more detail, the photo sensor may include photo diodes and transistors at rows and columns to scan content received at the photo sensor using an electrical signal which changes according to the quantity of applied light. Namely, the photo sensor may calculate the coordinates of the physical object according to variation of light to thus obtain position information of the physical object.

The display unit 151 is generally configured to output information processed in the mobile terminal 100. For example, the display unit 151 may display execution screen information of an application program executing at the mobile terminal 100 or user interface (UI) and graphic user interface (GUI) information in response to the execution screen information.

In some embodiments, the display unit 151 may be implemented as a stereoscopic display unit for displaying stereoscopic images. A typical stereoscopic display unit may employ a stereoscopic display scheme such as a stereoscopic scheme (a glass scheme), an auto-stereoscopic scheme (glassless scheme), a projection scheme (holographic scheme), or the like.

The audio output module 152 is generally configured to output audio data. Such audio data may be obtained from any of a number of different sources, such that the audio data may be received from the wireless communication unit 110 or may have been stored in the memory 170. The audio data may be output during modes such as a signal reception mode, a call mode, a record mode, a voice recognition mode, a broadcast reception mode, and the like. The audio output module 152 can provide audible output related to a particular function (e.g., a call signal reception sound, a message reception sound, etc.) performed by the mobile terminal 100. The audio output module 152 may also be implemented as a receiver, a speaker, a buzzer, or the like.

A haptic module 153 can be configured to generate various tactile effects that a user feels, perceive, or otherwise experience. A typical example of a tactile effect generated by the haptic module 153 is vibration. The strength, pattern and the like of the vibration generated by the haptic module 153 can be controlled by user selection or setting by the controller. For example, the haptic module 153 may output different vibrations in a combining manner or a sequential manner.

Besides vibration, the haptic module 153 can generate various other tactile effects, including an effect by stimulation such as a pin arrangement vertically moving to contact skin, a spray force or suction force of air through a jet orifice or a suction opening, a touch to the skin, a contact of an electrode, electrostatic force, an effect by reproducing the sense of cold and warmth using an element that can absorb or generate heat, and the like.

The haptic module 153 can also be implemented to allow the user to feel a tactile effect through a muscle sensation such as the user's fingers or arm, as well as transferring the tactile effect through direct contact. Two or more haptic modules 153 may be provided according to the particular configuration of the mobile terminal 100.

An optical output module 154 can output a signal for indicating an event generation using light of a light source. Examples of events generated in the mobile terminal 100 may include message reception, call signal reception, a missed call, an alarm, a schedule notice, an email reception, information reception through an application, and the like.

A signal output by the optical output module 154 may be implemented so the mobile terminal emits monochromatic light or light with a plurality of colors. The signal output may be terminated as the mobile terminal senses that a user has checked the generated event, for example.

The interface unit 160 serves as an interface for external devices to be connected with the mobile terminal 100. For example, the interface unit 160 can receive data transmitted from an external device, receive power to transfer to elements and components within the mobile terminal 100, or transmit internal data of the mobile terminal 100 to such external device. The interface unit 160 may include wired or wireless headset ports, external power supply ports, wired or wireless data ports, memory card ports, ports for connecting a device having an identification module, audio input/output (I/O) ports, video I/O ports, earphone ports, or the like.

The identification module may be a chip that stores various information for authenticating authority of using the mobile terminal 100 and may include a user identity module (UIM), a subscriber identity module (SIM), a universal subscriber identity module (USIM), and the like. In addition, the device having the identification module (also referred to herein as an "identifying device") may take the form of a smart card. Accordingly, the identifying device can be connected with the terminal 100 via the interface unit 160.

When the mobile terminal 100 is connected with an external cradle, the interface unit 160 can serve as a passage to allow power from the cradle to be supplied to the mobile terminal 100 or may serve as a passage to allow various command signals input by the user from the cradle to be transferred to the mobile terminal there through. Various command signals or power input from the cradle may operate as signals for recognizing that the mobile terminal is properly mounted on the cradle.

The memory 170 can store programs to support operations of the controller 180 and store input/output data (for example, phonebook, messages, still images, videos, etc.). The memory 170 may store data related to various patterns of vibrations and audio which are output in response to touch inputs on the touch screen.

The memory 170 may include one or more types of storage mediums including a Flash memory, a hard disk, a solid state disk, a silicon disk, a multimedia card micro type, a card-type memory (e.g., SD or DX memory, etc.), a Random Access Memory (RAM), a Static Random Access Memory (SRAM), a Read-Only Memory (ROM), an Electrically Erasable Programmable Read-Only Memory (EEPROM), a Programmable Read-Only memory (PROM), a magnetic memory, a magnetic disk, an optical disk, and the like. The mobile terminal 100 may also be operated in relation to a network storage device that performs the storage function of the memory 170 over a network, such as the Internet.

The controller 180 can typically control the general operations of the mobile terminal 100. For example, the controller 180 can set or release a lock state for restricting a user from inputting a control command with respect to applications when a status of the mobile terminal meets a preset condition.

The controller 180 can also perform the controlling and processing associated with voice calls, data communications, video calls, and the like, or perform pattern recognition processing to recognize a handwriting input or a picture drawing input performed on the touch screen as characters or images, respectively. In addition, the controller 180 can control one or a combination of those components in order to implement various exemplary embodiments disclosed herein.

The power supply unit 190 receives external power or provide internal power and supply the appropriate power required for operating respective elements and components included in the mobile terminal 100. The power supply unit 190 may include a battery, which is typically rechargeable or be detachably coupled to the terminal body for charging.

The power supply unit 190 may include a connection port. The connection port may be configured as one example of the interface unit 160 to which an external charger for supplying power to recharge the battery is electrically connected.

As another example, the power supply unit 190 may be configured to recharge the battery in a wireless manner without use of the connection port. In this example, the power supply unit 190 can receive power, transferred from an external wireless power transmitter, using at least one of an inductive coupling method which is based on magnetic induction or a magnetic resonance coupling method which is based on electromagnetic resonance. Various embodiments described herein may be implemented in a computer-readable medium, a machine-readable medium, or similar medium using, for example, software, hardware, or any combination thereof.

Referring now to FIGS. 1B and 1C, the mobile terminal 100 is described with reference to a bar-type terminal body. However, the mobile terminal 100 may alternatively be implemented in any of a variety of different configurations. Examples of such configurations include watch-type, clip-type, glasses-type, or as a folder-type, flip-type, slide-type, swing-type, and swivel-type in which two and more bodies are combined with each other in a relatively movable manner, and combinations thereof. Discussion herein will often relate to a particular type of mobile terminal (for example, bar-type, watch-type, glasses-type, and the like). However, such teachings with regard to a particular type of mobile terminal will generally apply to other types of mobile terminals as well.

The mobile terminal 100 will generally include a case (for example, frame, housing, cover, and the like) forming the appearance of the terminal. In this embodiment, the case is formed using a front case 101 and a rear case 102. Various electronic components are incorporated into a space formed between the front case 101 and the rear case 102. At least one middle case may be additionally positioned between the front case 101 and the rear case 102.

The display unit 151 is shown located on the front side of the terminal body to output information. As illustrated, a window 151a of the display unit 151 may be mounted to the front case 101 to form the front surface of the terminal body together with the front case 101.

In some embodiments, electronic components may also be mounted to the rear case 102. Examples of such electronic components include a detachable battery 191, an identification module, a memory card, and the like. Rear cover 103 is shown covering the electronic components, and this cover may be detachably coupled to the rear case 102. Therefore, when the rear cover 103 is detached from the rear case 102, the electronic components mounted to the rear case 102 are externally exposed.

As illustrated, when the rear cover 103 is coupled to the rear case 102, a side surface of the rear case 102 is partially exposed. In some cases, upon the coupling, the rear case 102 may also be completely shielded by the rear cover 103. In some embodiments, the rear cover 103 may include an opening for externally exposing a camera 121b or an audio output module 152b.

The cases 101, 102, 103 may be formed by injection-molding synthetic resin or may be formed of a metal, for example, stainless steel (STS), aluminum (Al), titanium (Ti), or the like. As an alternative to the example in which the plurality of cases form an inner space for accommodating components, the mobile terminal 100 may be configured such that one case forms the inner space. In this example, a mobile terminal 100 having a uni-body is formed so synthetic resin or metal extends from a side surface to a rear surface.

If desired, the mobile terminal 100 may include a waterproofing unit for preventing introduction of water into the terminal body. For example, the waterproofing unit may include a waterproofing member which is located between the window 151a and the front case 101, between the front case 101 and the rear case 102, or between the rear case 102 and the rear cover 103, to hermetically seal an inner space when those cases are coupled.

FIGS. 1B and 1C depict certain components as arranged on the mobile terminal. However, alternative arrangements are possible and within the teachings of the instant disclosure. Some components may be omitted or rearranged. For example, the first manipulation unit 123a may be located on another surface of the terminal body, and the second audio output module 152b may be located on the side surface of the terminal body.

The display unit 151 outputs information processed in the mobile terminal 100. The display unit 151 may be implemented using one or more suitable display devices. Examples of such suitable display devices include a liquid crystal display (LCD), a thin film transistor-liquid crystal display (TFT-LCD), an organic light emitting diode (OLED), a flexible display, a 3-dimensional (3D) display, an e-ink display, and combinations thereof.

The display unit 151 may be implemented using two display devices, which can implement the same or different display technology. For instance, a plurality of the display units 151 may be arranged on one side, either spaced apart from each other, or these devices may be integrated, or these devices may be arranged on different surfaces.

The display unit 151 may also include a touch sensor which senses a touch input received at the display unit. When a touch is input to the display unit 151, the touch sensor may be configured to sense this touch and the controller 180, for example, may generate a control command or other signal corresponding to the touch. The content which is input in the touching manner may be a text or numerical value, or a menu item which can be indicated or designated in various modes.

The touch sensor may be configured in a form of a film having a touch pattern, disposed between the window 151a and a display on a rear surface of the window 151a, or a metal wire which is patterned directly on the rear surface of the window 151a. Alternatively, the touch sensor may be integrally formed with the display. For example, the touch sensor may be disposed on a substrate of the display or within the display.

The display unit 151 may also form a touch screen together with the touch sensor. Here, the touch screen may serve as the user input unit 123 (see FIG. 1A). Therefore, the touch screen may replace at least some of the functions of the first manipulation unit 123a. The first audio output module 152a may be implemented in the form of a speaker to output voice audio, alarm sounds, multimedia audio reproduction, and the like.

The window 151a of the display unit 151 will typically include an aperture to permit audio generated by the first audio output module 152a to pass. One alternative is to allow audio to be released along an assembly gap between the structural bodies (for example, a gap between the window 151a and the front case 101). In this instance, a hole independently formed to output audio sounds may not be seen or is otherwise hidden in terms of appearance, thereby further simplifying the appearance and manufacturing of the mobile terminal 100.

The optical output module 154 can be configured to output light for indicating an event generation. Examples of such events include a message reception, a call signal reception, a missed call, an alarm, a schedule notice, an email reception, information reception through an application, and the like. When a user has checked a generated event, the controller can control the optical output unit 154 to stop the light output.

The first camera 121a can process image frames such as still or moving images obtained by the image sensor in a capture mode or a video call mode. The processed image frames can then be displayed on the display unit 151 or stored in the memory 170. A third camera 121c may be further provided on a front surface of the terminal body. In this instance, the third camera 121c may be disposed near the first camera 121a, or near the opposite side to the first camera 121a (i.e., the optical output unit 154).

The third camera 121c may be provided with a wide angle lens. In this instance, the third camera 121c may support a wider viewing angle than the first camera 121a. In a general angle mode, the first camera 121a may be activated for capturing. And in a wide angle mode, the third camera 121c may be activated for capturing. An image captured by the third camera 121c may include a larger number of subjects than an image captured by the first camera 121a. However, in this instance, distortion occurs toward a peripheral part of a frame.

The third camera 121c may be activated together with or independently from the first camera 121a when the first camera 121a is activated. If the third camera 121c is activated together when the second camera 121b formed on a rear surface of the terminal body is activated, an image captured by the third camera 121c may be used to compensate for a white balance reference value of an image captured by the first camera 121a.

The first and second manipulation units 123a and 123b are examples of the user input unit 123, which may be manipulated by a user to provide input to the mobile terminal 100. The first and second manipulation units 123a and 123b may also be commonly referred to as a manipulating portion, and may employ any tactile method that allows the user to perform manipulation such as touch, push, scroll, or the like. The first and second manipulation units 123a and 123b may also employ any non-tactile method that allows the user to perform manipulation such as proximity touch, hovering, or the like.

FIG. 1B illustrates the first manipulation unit 123a as a touch key, but possible alternatives include a mechanical key, a push key, a touch key, and combinations thereof. Input received at the first and second manipulation units 123a and 123b may be used in various ways. For example, the first manipulation unit 123a may be used by the user to provide an input to a menu, home key, cancel, search, or the like, and the second manipulation unit 123b may be used by the user to provide an input to control a volume level being output from the first or second audio output modules 152a or 152b, to switch to a touch recognition mode of the display unit 151, or the like.

As another example of the user input unit 123, a rear input unit may be located on the rear surface of the terminal body. The rear input unit can be manipulated by a user to provide input to the mobile terminal 100. The input may be used in a variety of different ways. For example, the rear input unit may be used by the user to provide an input for power on/off, start, end, scroll, control volume level being output from the first or second audio output modules 152a or 152b, switch to a touch recognition mode of the display unit 151, and the like. The rear input unit may be configured to permit touch input, a push input, or combinations thereof.

The rear input unit may be located to overlap the display unit 151 of the front side in a thickness direction of the terminal body. As one example, the rear input unit may be located on an upper end portion of the rear side of the terminal body such that a user can easily manipulate it using a forefinger when the user grabs the terminal body with one hand. Alternatively, the rear input unit can be positioned at most any location of the rear side of the terminal body.

Embodiments that include the rear input unit may implement some or all of the functionality of the first manipulation unit 123a in the rear input unit. As such, in situations where the first manipulation unit 123a is omitted from the front side, the display unit 151 can have a larger screen.

As a further alternative, the mobile terminal 100 may include a finger scan sensor which scans a user's fingerprint. The controller 180 can then use fingerprint information sensed by the finger scan sensor as part of an authentication procedure. The finger scan sensor may also be installed in the display unit 151 or implemented in the user input unit 123.

The microphone 122 is shown located at an end of the mobile terminal 100, but other locations are possible. If desired, multiple microphones may be implemented, with such an arrangement permitting the receiving of stereo sounds.

The interface unit 160 may serve as a path allowing the mobile terminal 100 to interface with external devices. For example, the interface unit 160 may include one or more of a connection terminal for connecting to another device (for example, an earphone, an external speaker, or the like), a port for near field communication (for example, an Infrared Data Association (IrDA) port, a Bluetooth port, a wireless LAN port, and the like), or a power supply terminal for supplying power to the mobile terminal 100. The interface unit 160 may be implemented in the form of a socket for accommodating an external card, such as Subscriber Identification Module (SIM), User Identity Module (UIM), or a memory card for information storage.

The second camera 121b is shown located at the rear side of the terminal body and includes an image capturing direction that is substantially opposite to the image capturing direction of the first camera unit 121a. If desired, second camera 121a may alternatively be located at other locations, or made to be moveable, in order to have a different image capturing direction from that which is shown.

The second camera 121b can include a plurality of lenses arranged along at least one line. The plurality of lenses may also be arranged in a matrix configuration. The cameras may be referred to as an "array camera." When the second camera 121b is implemented as an array camera, images may be captured in various manners using the plurality of lenses and images with better qualities.

As shown in FIG. 1C, a flash 124 is shown adjacent to the second camera 121b. When an image of a subject is captured with the camera 121b, the flash 124 may illuminate the subject. As shown in FIG. 1C, the second audio output module 152b can be located on the terminal body. The second audio output module 152b may implement stereophonic sound functions in conjunction with the first audio output module 152a, and may be also used for implementing a speaker phone mode for call communication.

At least one antenna for wireless communication may be located on the terminal body. The antenna may be installed in the terminal body or formed by the case. For example, an antenna which configures a part of the broadcast receiving module 111 may be retractable into the terminal body. Alternatively, an antenna may be formed using a film attached to an inner surface of the rear cover 103, or a case that includes a conductive material.

A power supply unit 190 for supplying power to the mobile terminal 100 may include a battery 191, which is mounted in the terminal body or detachably coupled to an outside of the terminal body. The battery 191 may receive power via a power source cable connected to the interface unit 160. Also, the battery 191 can be recharged in a wireless manner using a wireless charger. Wireless charging may be implemented by magnetic induction or electromagnetic resonance.

The rear cover 103 is shown coupled to the rear case 102 for shielding the battery 191, to prevent separation of the battery 191, and to protect the battery 191 from an external impact or from foreign material. When the battery 191 is detachable from the terminal body, the rear case 103 may be detachably coupled to the rear case 102.

An accessory for protecting an appearance or assisting or extending the functions of the mobile terminal 100 can also be provided on the mobile terminal 100. As one example of an accessory, a cover or pouch for covering or accommodating at least one surface of the mobile terminal 100 may be provided. The cover or pouch may cooperate with the display unit 151 to extend the function of the mobile terminal 100. Another example of the accessory is a touch pen for assisting or extending a touch input to a touch screen.

In the present invention, the display unit 151 (or the touch sensor provided at the display unit 151) may generate a touch signal by sensing a touch degree of a touch input applied to the display unit 151, i.e., a pressure intensity. For this, the display unit 151 (or the touch sensor provided at the display unit 151) may include a plurality of piezoelectric devices. The generated touch signal includes information about a pressure intensity (or a piezoelectric intensity) of a touch input, and the generated touch signal is transferred to the controller 180 to perform a corresponding operation.

Figure 2:
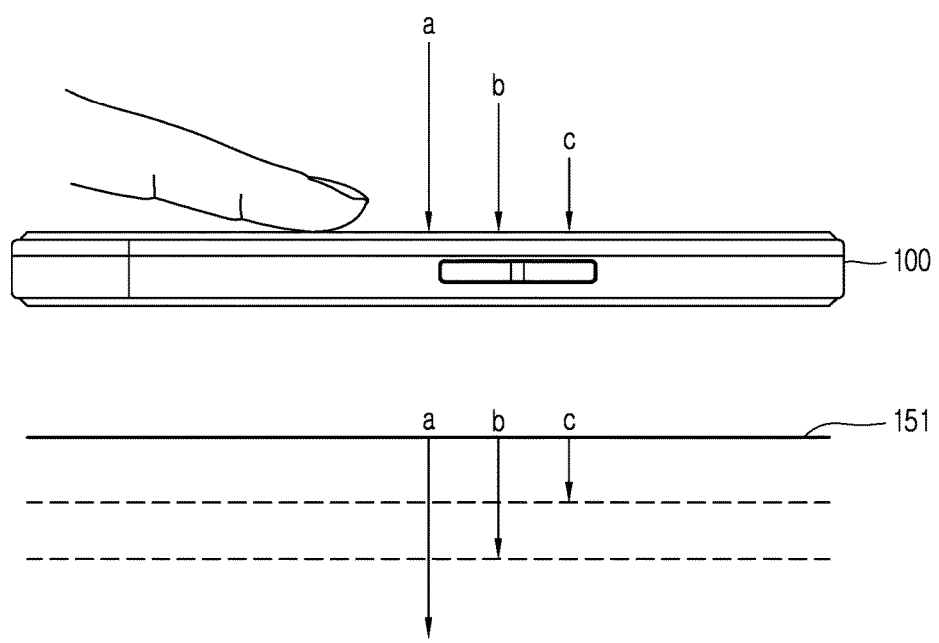
FIG. 2 is a view illustrating a touch degree of a touch input applied to a display unit, in a mobile terminal according to an embodiment of the present invention.

FIG. 2 is a view illustrating a touch degree of a touch input applied to a display unit, in a mobile terminal according to an embodiment of the present invention. As shown in FIG. 2, a touch pressure corresponding to a user's touch operation applied to the display unit 151 of the mobile terminal 100 may be sensed in various manners (a, b, c), and the controller 180 can execute an operation matching the sensed touch pressure. For this, the controller 180 can detect a voltage corresponding to the touch pressure, and may generate a different touch signal according to the detected voltage.

For instance, if a user presses the display unit 151 with an intensity of 'c', a voltage or a minimum voltage level (e.g., less than 0.04v) may be detected, and a first touch signal may be generated. If a user presses the display unit 151 with a higher intensity of 'b', a voltage of 0.04v~1.5v may be detected, and a second touch signal may be generated. And if a user presses the display unit 151 with a highest intensity of 'a', a maximum voltage level or a voltage of 1.5v~3.0v may be detected, and a third touch signal may be generated. Here, the first to third touch signals may be input values for executing different control commands. That is, a pressure intensity of each touch operation may be converted into a voltage value to thus be used as a different input value.

The aforementioned voltage levels and the voltage values are merely exemplary, and may be set variously. Further, a pressure intensity of a touch input is categorized into three, but the present invention is not limited to this. Further, a reference voltage is defined to categorize an operation according to a pressure intensity into two. However, the operation according to a pressure intensity may be categorized into three or more than.

The mobile terminal 100 according to an embodiment of the present invention, which includes at least one of the aforementioned components, displays, on the display unit 151 a search bar for controlling a video and a play time point of a video, according to a user's input. Once a touch degree of a first touch input applied to the search bar is changed, the controller 180 of the mobile terminal 100 may display preview images at a plurality of play time points on the screen, according to the touch degree of the first touch input. As a result, a user can immediately check preview images at a plurality of play time points, not a single play time point.

In the displayed state of the preview images at the plurality of play time points, if a second touch input is consecutively applied onto the search bar, a play speed of at least part of the displayed preview images may be changed. With such a configuration, a user can quickly check preview images at a plurality of play time points, with respect to a video being currently played, based on a touch degree of a touch input. And the user can pre-change a play speed at a specific play time point.

Figure 3:
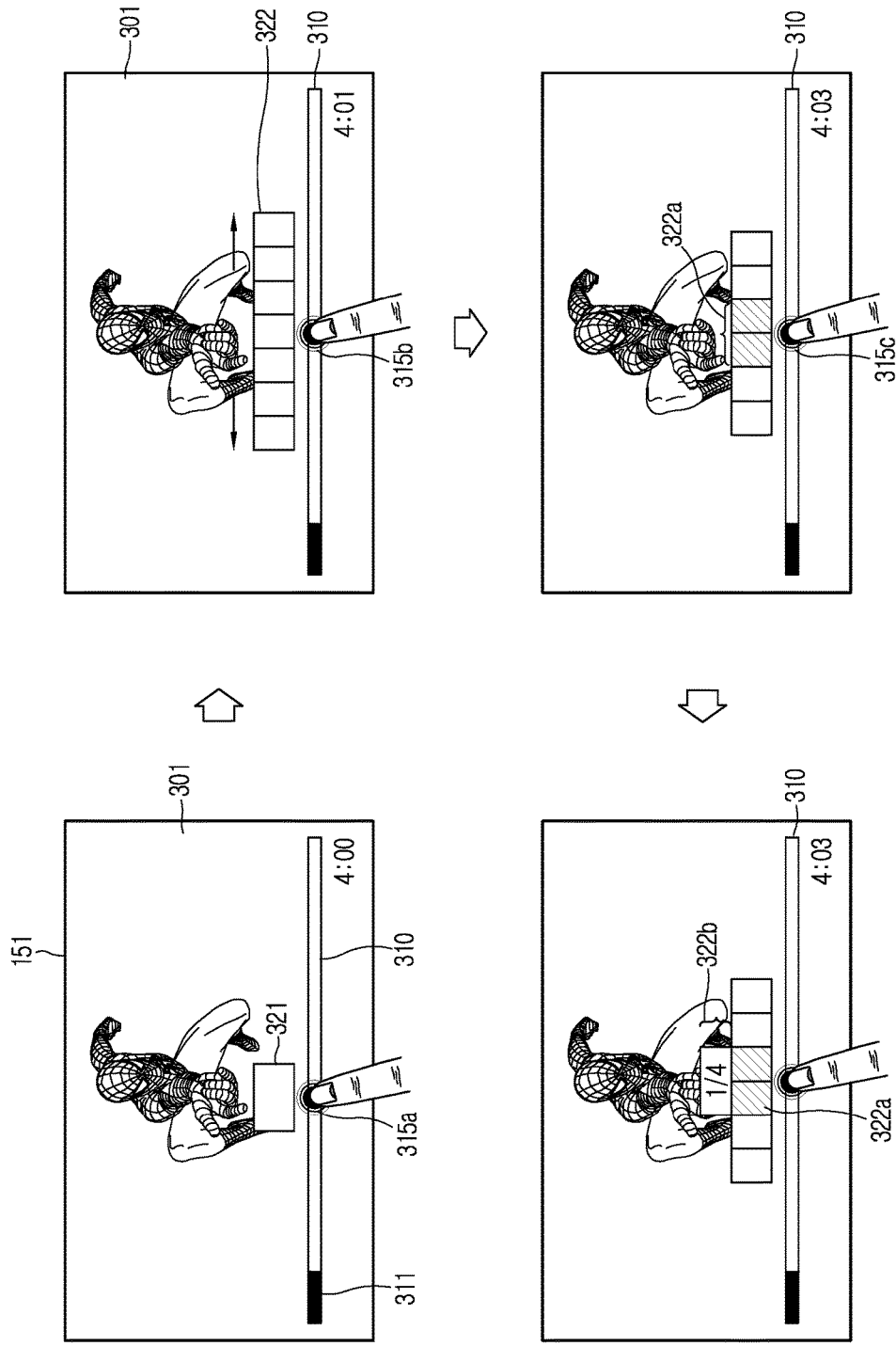
FIG. 3 illustrates conceptual views illustrating a representative operation of a mobile terminal according to an embodiment of the present invention.

Next, FIG. 3 illustrates conceptual views illustrating a representative operation of the mobile terminal according to an embodiment of the present invention. As shown in FIG. 3, when a video screen 301 is displayed on the display unit 151 of the mobile terminal 100, and if a touch input is applied onto the display unit 151, a search bar 310 for controlling a play time point of a video is output to a lower end of the video screen 301.

The video screen 301 may be one of a video screen stored in a gallery application of the mobile terminal 100, a video screen searched and selected according to execution of an application, and a video screen downloaded from a specific server. A graphic object 311 can be displayed on the search bar 310 indicating a play time point and a play degree of the video screen 301 output to the display unit 151, information on a total play time of a video, and information on a current play time (e.g., 4:00).

Once a touch input is applied to a region 315a on the search bar 310, a preview image 321 at a play time point corresponding to the region 315a where the touch input has been applied, can be displayed around the touch region 315a, in the form of a thumbnail.

In an embodiment, the preview image 321 may not be displayed in the form of a thumbnail, but the video screen 301 output to the display unit 151 may be converted into the preview image 321. Alternatively, while the touch input applied onto the touch region 315a is maintained, menu objects related to play (e.g., temporary pause, rewind, fast forward, etc.) can be displayed on the video screen 301. In this instance, the output of the preview image 321 by a touch input may be omitted.

Once the touch input applied onto the point 315a has a changed touch degree (315b), the single preview image 321 is converted into a plurality of preview images 322 at a plurality of play time points. In this instance, a user can be provided with a visual effect that the single preview image 321 is split into a plurality of preview images.

The change of the touch degree of the touch input may mean a change of a pressure of a touch input applied onto the touch region 315a. Alternatively, the change of the touch degree of the touch input may mean a touch input applied to the touch region 315a with a pressure more than a reference pressure, or may mean a touch input applied to the touch region 315a with a pressure less than the reference pressure. Here, the reference pressure means a touch degree that a detected voltage forms a reference voltage range (e.g., less than 1.5v).

Thus, a touch input having a pressure exceeding a reference pressure means a touch operation having a touch pressure that a voltage detected by a touch applied to any point or a specific region on the display unit 151 has a range exceeding a reference voltage range (e.g., 1.5v~3.0v). And the touch input having a pressure less than the reference pressure means a touch operation to apply a touch input exceeding the reference pressure, and then to change the touch pressure into a value within the reference voltage range (e.g., less than 1.5v) within a predetermined time.

The preview images 322 may be preview images at play time points spaced from each other at preset time intervals, and can be displayed by being connected to each other as a single list in a time order. Thus, a user can visually check scenes at a plurality of play time points, while viewing the video screen 301.

In the displayed state of the preview images at a plurality of play time points, if a touch input with a pressure more than a reference pressure is applied as an additional input 315c, some of the preview images 322 displayed around a touch region of the touch input are selected (322a). As a touch degree of the touch input 315c is changed, a play speed at play time points corresponding to the selected preview images 322a is changed.

Once the play speed is changed, information 322b on the changed play speed is displayed around the selected preview images 322a. A user can properly change the touch degree of the touch input 315c based on the displayed information 322b, thereby properly controlling the play speed to be changed. Then, for time reaches the play points corresponding to the selected preview images 322a, the controller 180 plays corresponding scenes at a speed lower than a preset speed by ¼ times, for instance.

In the present invention, a user can pre-check scenes at a plurality of play time points, based on a touch degree of a touch input applied to a search bar, while viewing a current video screen. And a play speed at a specific play time point may be arbitrarily changed.

Next, FIG. 4 is a flowchart illustrating the operation of FIG. 3. Firstly, a search bar for controlling a video and play of the video is displayed on the display unit 151 of the mobile terminal (S10). The search bar can be displayed on a lower end of a video screen, if a single touch input is applied to the video screen being played, for instance.

Once a first touch input is applied to the displayed search bar, a preview image at a play time point corresponding to a touch region of the first touch input is displayed (S20). Here, the first touch input means a touch operation to form a range of a reference voltage applied to any point on the search bar, and to maintain such a touch input without a release operation. The preview image can be displayed around the touch region of the first touch input, in the form of a pop-up window. In this instance, if the first touch input is dragged, the pop-up window moves from the touch region of the first touch input, and the preview image may be converted into a preview image at a play time point corresponding to the moved position.

While the preview image is displayed as the first touch input is applied onto the search bar, the play of the video may be maintained. As aforementioned, in an embodiment, a preview image at a play time point corresponding to a touch region to which a touch input has been applied may be output to the entire region of the display unit 151. In this instance, play of a video may be temporarily stopped while the touch input is maintained.

Next, the controller 180 of the mobile terminal 100 converts a preview image at a play time point into preview images at a plurality of play time points, as the touch degree of the first touch input is changed (S30). The change of the touch degree of the first touch input may mean a change of a pressure of the first touch input, as aforementioned. More specifically, the change of the touch degree of the first touch input may mean a touch input applied to the touch region of the first touch input with a pressure more than a reference pressure, or a touch input subsequently applied with a pressure less than the reference pressure.

The preview images at the plurality of play time points may be images at play time points obtained as the entire video is divided at preset time intervals. Alternatively, the preview images at a plurality of play time points may be a preview image at a play time point corresponding to the touch region of the first touch input, and preview images at play time points before and after the play time point.

The controller 180 can differently control a time interval of a plurality of play time points, based on the touch degree of the first touch input applied to the search bar. For instance, if the touch degree of the first touch input is high, the time interval of the plurality of play time points is smaller than a reference value. Further, if the touch degree of the first touch input is low, the time interval of the plurality of play time points may be larger than the reference value.

For this, the controller 180 can generate preview images at a plurality of play time points with respect to a video, and/or store the preview images in the memory 160. Then, the controller 180 can control some of the stored preview images to be selected, based on the touch degree of the first touch input. In this instance, the preview images may be selected based on a play time point corresponding to the touch region of the first touch input.

In an embodiment where a preview image at a play time point is displayed on the entire region of the display unit 151, preview images at a plurality of play time points may be selectively displayed on the entire region of the display unit 151. In this instance, on each of the preview images, information on a corresponding play time point may be displayed.

Once a preview image at a play time point is converted into preview images at a plurality of play time points, the controller 180 can output a corresponding feedback signal, e.g., a preset visual effect, sound, vibration, etc. If the preview images at the plurality of play time points are displayed, even if the first touch input applied to the search bar is released, the controller 180 does not change the play time point into one corresponding to a release time point of the first touch input. That is, a control command for changing a play time point is ignored or such an input is restricted.

While the preview images at the plurality of play time points are being displayed, the controller 180 can maintain an operation state (e.g., a play state, a temporary pause state) of the video output to the display unit 180. As aforementioned, if the preview images are displayed on the entire region of the display unit 151, the play of the video may be temporarily stopped until a user's manipulation to be explained later is terminated.

When the preview images at a plurality of play time points are displayed on the display unit 151, and if a second touch input is consecutively applied onto the search bar, the controller 180 can change a play speed at a play time point corresponding to at least part of the displayed preview images (S40).

Here, a type of the second touch input can be changed according to a change direction of a play speed, i.e., according to whether a current play speed is high or low. Further, a change degree of a play speed can be changed according to a touch degree of the second touch input, a touch frequency (the number of times of touches), a touch maintenance time, etc. This will be explained later in more detail with reference to the attached drawings.

When a play speed at a specific play time point is changed as the second touch input is applied to the search bar, if there is a play time point where a play speed has been already changed, a graphic object indicating the play time point may be displayed. For instance, a preview image at a play time point where a play speed has been already changed, is provided with an image changed according to the play speed, or a highlighting effect. This allows a user to visually recognize a time point or a section where a play speed has been changed.

If a first touch input is released with its touch degree not changed, or if a single touch input is applied onto one of preview images at a plurality of play time points, a current time point jumps to a play time point corresponding to the preview image such that the video is played.

As aforementioned, in the present invention, preview images at a plurality of play time points may be simultaneously checked based on a touch degree of a touch input applied onto the display unit 180 while a video is being displayed. Further, a play speed of a specific play time point can be changed to be faster than a current play speed.

Figure 5B:
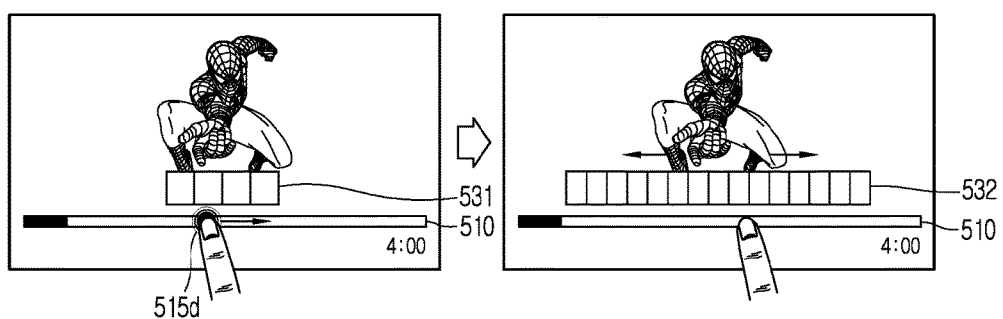

Next, FIGS. 5A and 5B illustrate various examples to change a display degree of preview images, based on a change degree of a touch degree of a first touch input applied onto a search bar. Referring to FIG. 5A, if a first touch input having a pressure exceeding a reference pressure is applied onto a search bar, the number of preview images at a plurality of play time points is determined in proportion to a touch degree of the first touch input.

For instance, if the first touch input having a pressure less than the reference pressure is maintained, a preview image at a play time point, i.e., a single preview image 521 is displayed. As a touch degree of the first touch input is increased, a large number of preview images are displayed. For instance, as a touch degree of the first touch input is gradually increased, a first list 522 having 4 preview images, and a second list 523 having 15 preview images can be sequentially output.

In this instance, a play time interval of the preview images included in the first list 522 may be larger than a play time interval of the preview images included in the second list 523. For instance, the preview images included in the first list 522 may be 4 preview images provided at a time interval of 1 minute, and the preview images included in the second list 523 may be 15 preview images provided at a time interval of 20 seconds.

Each of the preview images included in the lists 522, 523 may be provided with information indicating each play time point (e.g., a number indicating a minute or a second at a corresponding play time point). If the touch degree of the first touch input is decreased in the output state of the second list 523, the first list 522 having a reduced number of preview images can be re-output.

In an embodiment, even if the first touch input has the same touch degree, the content of the preview images included in the lists 522, 523 can be changed according to a touch region of the first touch input. In another embodiment, the number of the preview images may be determined based on a touch degree, regardless of a touch region of the first touch input, for selection of specific preview images.

In an embodiment, if at least two preview images are displayed as the touch degree of the first touch input exceeds the reference pressure, even if the touch degree of the first touch input is decreased to a value less than the reference pressure, the displayed preview images may not be converted into a preview image at a play time point.

More specifically, if the first touch input is applied with a pressure not exceeding the reference pressure, the controller 180 can operate in a first search mode for searching a specific play time point. And if the first touch input has a pressure exceeding the reference pressure, the controller 180 can convert the first search mode into a second search mode for searching a plurality of play time points. In this instance, the controller 180 can output a visual cue signal indicating the conversion into the second search mode. If a single touch input is applied to a specific preview image in the second search mode, a video may be played at a play time point of the specific preview image, like in the first search mode.

When the number of the preview images is determined based on a touch degree of a touch input, it may be difficult to minutely control the number of preview images at a plurality of play time points and a play time point, due to a limitation in distinguishing the touch degree.

FIG. 5B illustrates an example to minutely control the number of preview images at a plurality of play time points and a play time point, by applying an additional input to a search bar. In an embodiment, if a touch degree of a first touch input applied to a search bar is changed, the controller 180 can change a preview image at a play time point (hereinafter, will be referred to as 'first preview image'), into a second preview image. Here, the second preview image may be different from the first preview image in shape, size, color or the number. Alternatively, the second preview image may be a preview image obtained as a highlighting effect is provided to the first preview image.

As the first preview image is converted into the second preview image, a user can visually recognize that the first search mode has been changed into the second search mode. Referring to FIG. 5B, in a displayed state of a second preview image 531 including thumbnail images at a plurality of play time points, if a drag input (e.g., a drag input applied right and left) is applied (515d) to a search bar 510, the controller 180 can unfold preview images at a plurality of play time points based on the second preview image 531, according to a drag degree of the drag input (532).

In this instance, the controller 180 can minutely control the number of preview images to be unfolded, according to a direction and a degree of the drag input applied to the search bar 510. For instance, if the drag input is applied in a first direction, preview images at play time points corresponding to the first direction may be unfolded. And if the drag input has a path change into a second direction, preview images at play time points corresponding to the second direction may be unfolded, while the preview images unfolded in the first direction are partially folded or the preview images unfolded in the first direction are maintained. As a result, a user can check preview images within a desired section at a time.

Figure 6A:
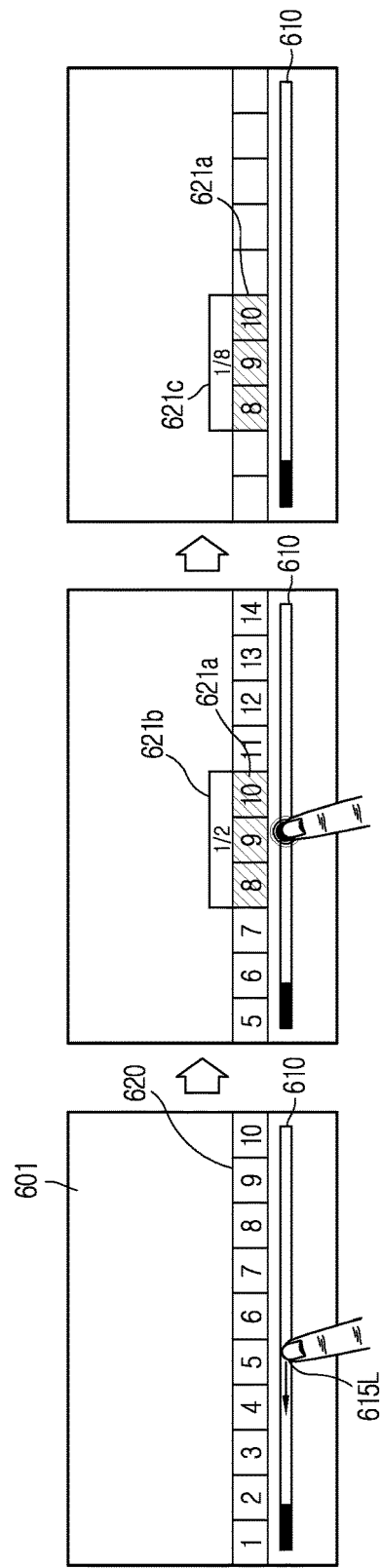

Next, FIG. 6A illustrates an example to change a play speed at a specific play time point into a low value, as a second touch input is applied to a search bar. As shown in FIG. 6A, when preview images at a plurality of time points 620 have been displayed near a search bar 610, if a drag input is applied to the search bar in one direction (e.g., the left side) (615L), the preview images at a plurality of time points 620 are scrolled in the direction. Accordingly, a user can search one or more preview images at one or more play time points where a play speed is to be changed.

Then, if a second touch input having a pressure more than a reference pressure is applied to the search bar 610, the controller 180 can select at least one preview image 621a based on a touch region of the second touch input, and may change a play speed of the selected preview image 621a to be lower than a set speed.

The controller 180 can control a change degree of a play speed according to a touch degree of the second touch input. For instance, when a touch degree of the second touch input applied to the search bar is increased, a play speed may be set to be lower. In this instance, graphic objects 621b, 621c indicating a change speed controlled according to the touch degree are displayed near the selected preview image 621a.

For instance, referring to FIG. 6A, when the first graphic object 621b indicating that a play speed has been changed into ½, if the touch degree of the second touch input is more increased, the first graphic object 621b can be changed into the second graphic object 621c indicating that the play speed has been changed into ⅛.

Once the play speed is changed, a visual effect (e.g., a highlighting effect) may be provided to the preview images 621a. In an embodiment, a screen corresponding to one of the preview images 621a having the changed play speed may be output. And if the second touch input is released, play may be executed from the output screen with the play speed (⅛).

If the second touch input having a pressure exceeding the reference pressure is applied to the search bar 610, the controller 180 can display preview images at different play time points set to have a low play speed, in an assembled manner. Accordingly, a user can check sections set to have a low play speed at a time, thereby executing play, edition, deletion, etc.

Figure 6B:
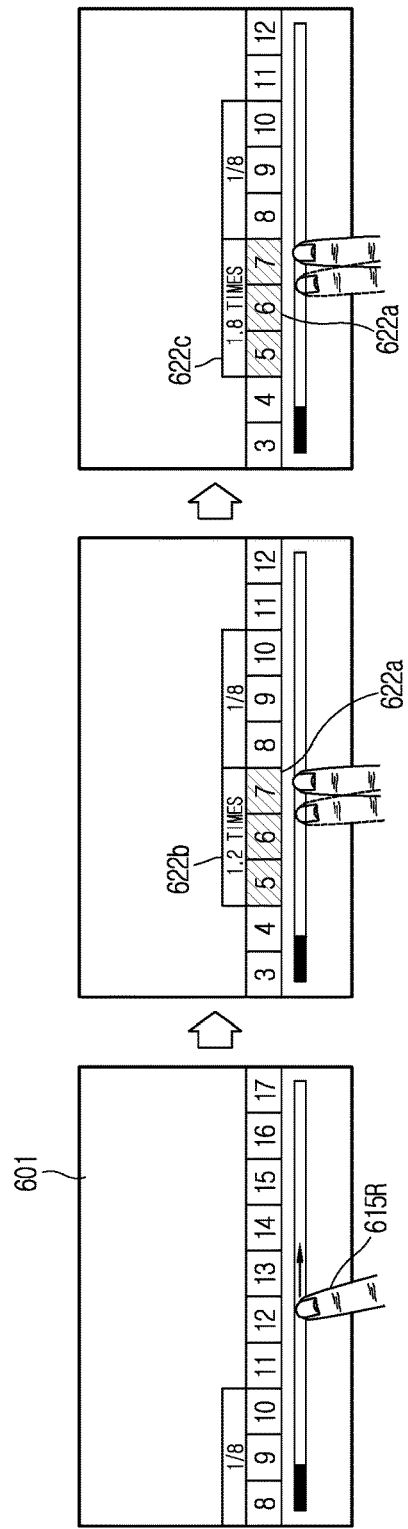

FIG. 6B illustrates an example to change a play speed at a specific play time point into a high value, as a second touch input is applied to a search bar. As shown in FIG. 6B, when preview images at a plurality of play time points have been displayed around a search bar, if a drag input is applied to the search bar in one direction (e.g., the right side) (615R), the displayed preview images at a plurality of play time points are scrolled in the direction.

Then, if a plurality of taps are applied to the search bar as the second touch input, the controller 180 can select at least some preview images 622a based on an input region of the plurality of taps, and may change a play speed of the selected preview images 622a to be higher than a set speed. In this instance, a preset visual effect (e.g., a highlighting effect) may be provided to the preview images 622a having a play speed changed to be higher.

The controller 180 can control a change degree of the play speed based on a touch degree of the second touch input. For instance, when the number of times that a plurality of taps are applied to the search bar is increased, the play speed of the selected preview images 622a may be set to have a high value. For instance, referring to FIG. 6B, the play speed of some preview images 622a is changed to be higher by 1.2 times according to a plurality of taps initially applied (refer to 622a). As a plurality of taps are consecutively applied to the search bar 610, a change degree of the play speed of the preview images 622a may be increased. As a result, the play speed of the preview images 622a can be changed to be higher by 1.8 times (622c).

If the plurality of taps are applied to the search bar 610, the controller 180 can display the preview images at different play time points in an assembled manner, the preview images set to have a high play speed. Accordingly, a user can check sections set to have a high play speed at a time, thereby executing play, edition, deletion, etc.

Figure 6D:
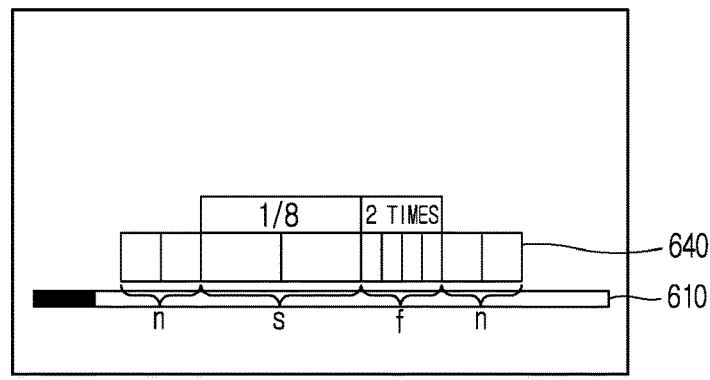

Referring to FIGS. 6C and 6D, when a play speed of displayed preview images 630 is changed at a play time point, the controller 180 can change the corresponding preview image at the play time point, into an image corresponding to the changed play speed.

The change of the preview image may mean a change of the preview image in shape, size, color, highlighting effect, etc., in correspondence to the changed play speed. More specifically, as shown in FIG. 6C, if a play speed of some preview images is changed to be higher (a→a") as a plurality of taps are applied to the search bar 610, the preview images may be converted into images having a contracted width. As shown in FIG. 6D, a section having a lower play speed than a reference section (n) having a reference speed (a general play speed), can be displayed as an image (s) having an increased width. With such a configuration, a user can visually recognize preview images to be played with a low or high play speed.

Figure 6E:
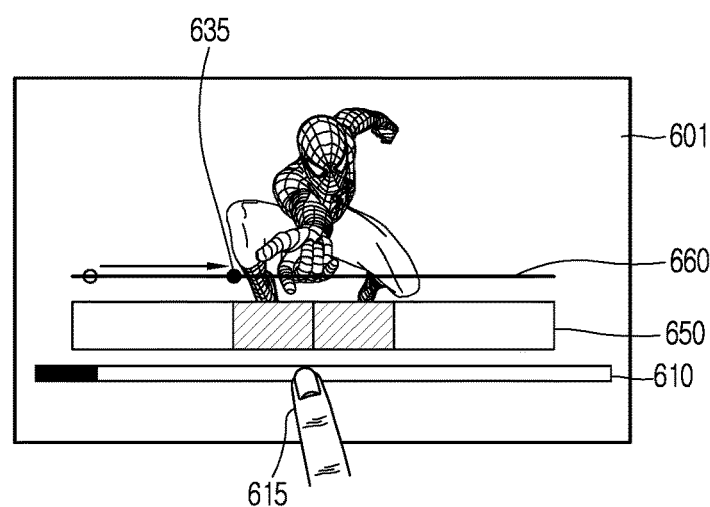

As shown in FIG. 6E, an indicator indicating a change degree of a play speed to be applied to some preview images may be further displayed. For instance, referring to FIG. 6E, if some preview images are selected as a touch degree of a second touch input 615 applied to the search bar 610 is changed, an indicator bar 660 can be displayed above the selected preview images. In the displayed state of the indicator bar 660, if the touch degree of the second touch input 615 is changed or if the second touch input 615 is dragged in one direction, an object included in the indicator bar 660 is scrolled in the direction, thereby displaying a change degree of a play speed to be applied.

FIG. 6F illustrates an example to apply a changed play speed applied to some preview images, to other preview images, in an extended manner. A changed play speed may be applied to other preview images in an extended manner, based on a touch input applied to a graphic object 662 displayed near a corresponding preview image and indicating a changed play speed. Here, the graphic object includes information on a changed play speed (e.g., ⅛, 1.8 times, etc.).

The graphic object is displayed by depending on a display state of the corresponding preview image at a play time point. Accordingly, if the preview image disappears, the graphic object also disappears. And if the play speed of the preview image is changed, the information on the play speed included in the graphic object is automatically changed.

In the displayed state of the graphic object 662, if a second touch input applied to the search bar 610 is dragged in one direction without being released, the controller 180 converts the play speed of neighboring preview images corresponding to a dragged degree, into a play speed of the displayed graphic object. In this instance, the graphic object 662 may be converted into an image 662w increased according to a drag degree of the second touch input.

In another embodiment, a drag touch input may be applied to the graphic object 662 rather than the search bar 610, such that a changed play speed may be applied to neighboring preview images in an extended manner.

FIG. 7A illustrates an example to immediately apply a changed play speed to a current play time point output to the display unit 151. More specifically, referring to FIG. 7A, if a touch input having a pressure exceeding a reference pressure is applied to a graphic object 725 indicating a change of a play speed, the controller 180 can immediately change a play speed of a current video screen output to the display unit 151, into a play speed displayed on the graphic object 725. Accordingly, information 730 on a changed play speed is displayed on one region of the display unit 151, e.g., a right upper end of the display unit 151.

Figure 7B:
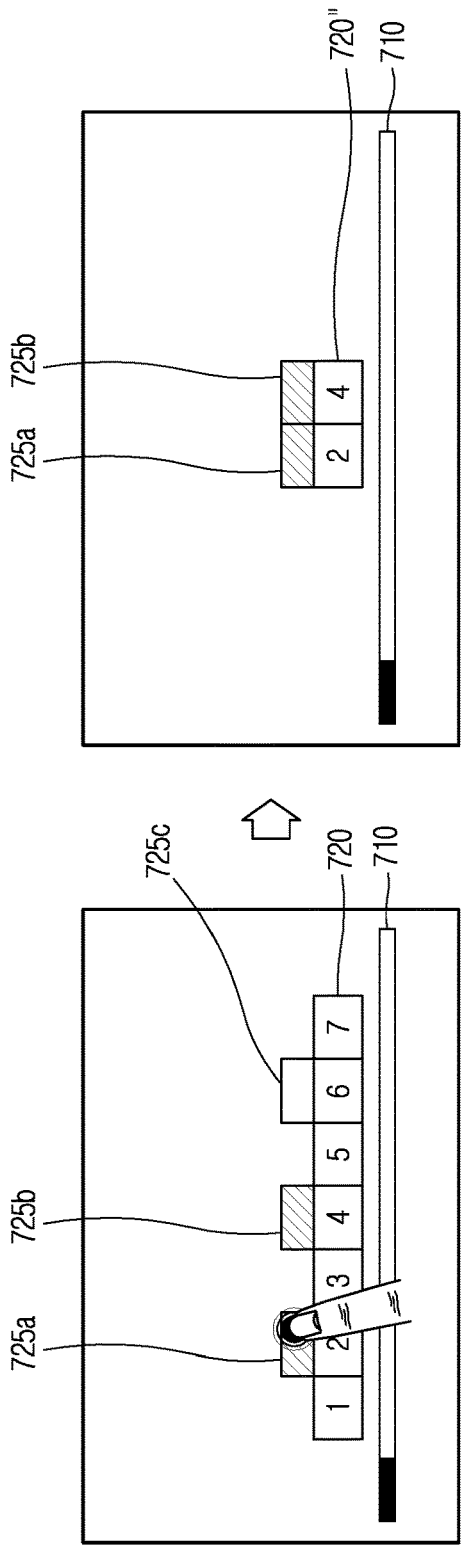

In another embodiment, as shown in FIG. 7B, when a plurality of sections have a changed play speed, if a preset touch gesture (e.g., a plurality of taps) is applied to one graphic object 725a among a plurality of graphic objects 725a, 725b indicating a change of a play speed, the controller 180 can display preview images at play time points having the same play speed as the graphic object 725a, in an assembled manner (720"). As a result, the plurality of graphic objects 725a, 725b displayed in a separated manner may be connected to each other.

Similarly, sections having a changed play speed (a high play speed or a low play speed) may be connected to each other to be displayed. In addition, if a flicking touch input is applied to one graphic object 725a among the plurality of graphic objects 725a, 725b in one direction (e.g., an upward or downward direction), the changed play speed may return to the initial preset play speed.

So far, has been explained examples to change a play speed at a plurality of play time points, using a touch input applied to a search bar while a video is being played on the display unit 151. Hereinafter, will be explained another operation which is executable by using a touch input applied to a search bar when a video being played on the display unit 151 is in a different operation state, i.e., when the video is in a temporary pause state.

In a temporary pause state of a video output to the display unit 151, if a single touch input is applied to the display unit 151, a search bar 810 to search for a play time point may be output to a lower end of a temporarily-paused video screen 801. Then, if a touch degree of a first touch input applied to any point on the search bar 810 is changed, i.e., if the touch degree of the first touch input exceeds a reference pressure, the controller 180 can execute an edition mode for executing edition related to a corresponding video. Accordingly, as shown in FIG. 8A, preview images at a plurality of play time points with respect to the corresponding video, are displayed on the display unit 151 (802).

On an execution screen in the edition mode, various edition menu objects related to the corresponding video can be displayed as default values or according to a user's manipulation. For instance, as shown in FIG. 8A, a first icon 811 for capturing a screen at a specific play time point, and a second icon 812 for generating a sub video which connects specific sections to each other can be displayed at an upper end of the display unit 151.

Figure 8A:
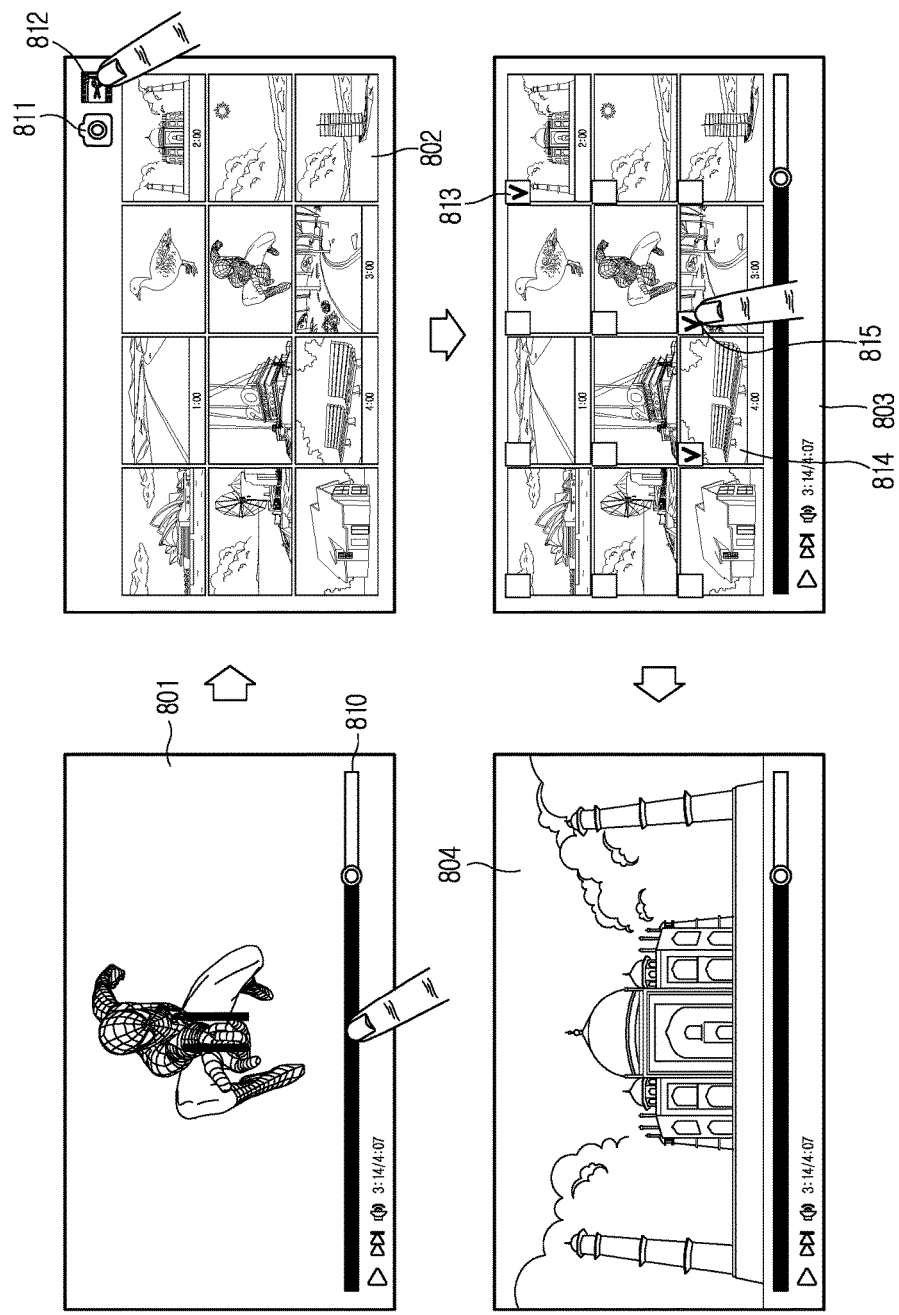

For instance, when the second icon 812 is selected, a selection window is displayed on each preview image as shown in FIG. 8A. A user can execute a multi-selection for desired preview images 813, 814, 815, using the selection windows. If the selection is confirmed through the user's check, the controller 180 connects sections corresponding to the selected preview images 813, 814, 815 to each other, thereby generating a sub video 804 and storing the sub video 804. Then, the generated sub video 804 may be played on the display unit 151.

Figure 8B:
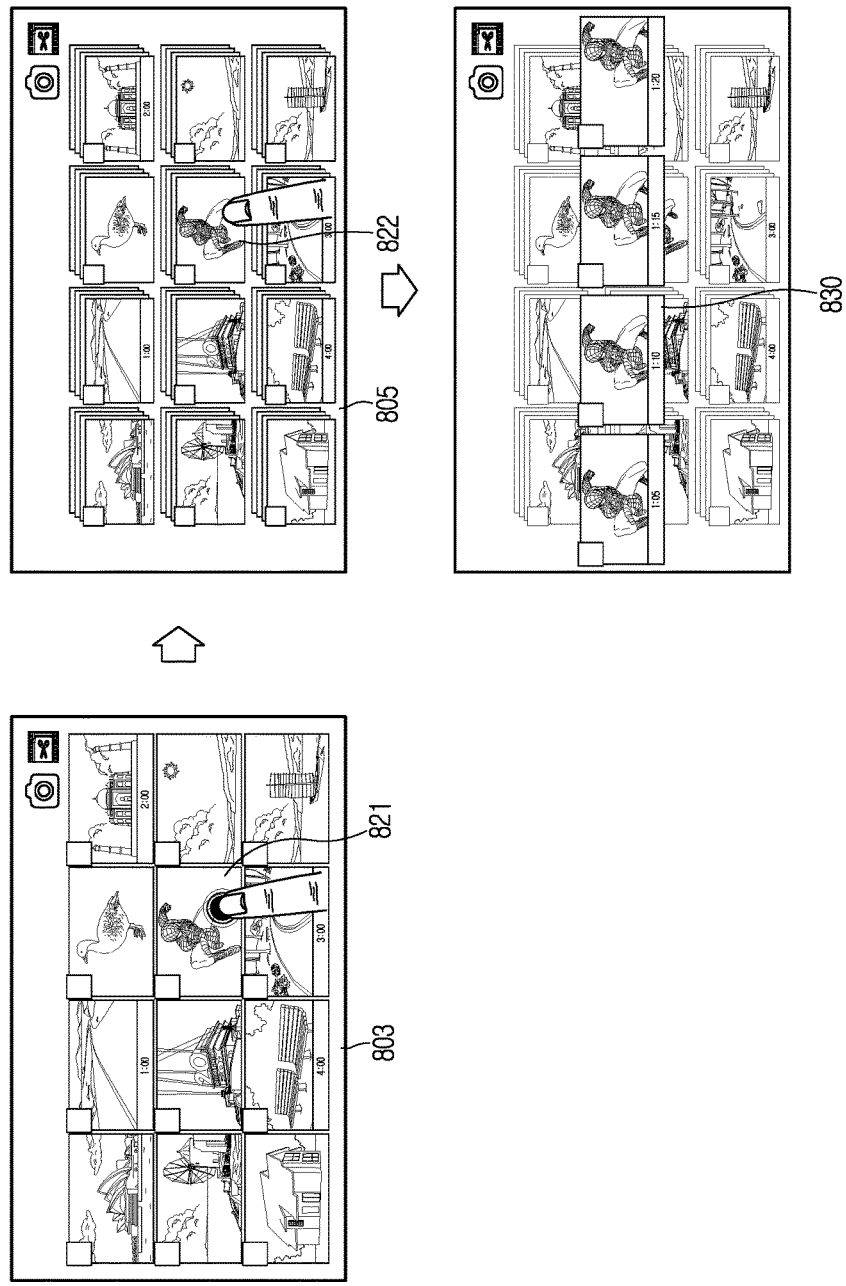

FIG. 8B illustrates an operation of the mobile terminal 100 for selecting a play time point to be edited, in a more detailed manner. Firstly, in the edition mode by the procedures of FIG. 8A, and in the displayed state of the selection windows on the preview images (803), a subsequent touch input having a pressure exceeding a reference pressure may be applied to one of the preview images. In this instance, the controller 180 converts each preview image into a plurality of sub preview images, in a detailed manner. As a result, as shown in FIG. 8B, each preview image is changed into a plurality of images overlapped with each other (805).

Then, if a single touch input is applied to one (822) of the preview images, a plurality of sub preview images of the preview image 822 are unfolded at a central part of the display unit 151 (830). Accordingly, a user can select for a more detailed play time point, thereby executing various editions.

FIG. 9 illustrates an example to change a play speed of a video at a specific play time point, in a video editor or an application which executes such a function. In particular, FIG. 9 illustrates an execution screen of a video editor or an application which executes such a function. Referring to FIG. 9, a video screen at a play time point can be displayed on a first region (e.g., the upper side), and preview images at a plurality of play time points related to the video screen output to the first region can be displayed on a second region (e.g., the lower side). In this state, if a touch input having a pressure exceeding a reference pressure is applied to one point on the second region, a plurality of preview images related to the touch region on the second region are displayed (902).

Then, if a first input (a touch input having a pressure exceeding a reference pressure) is applied to a specific preview image 921, a play speed of the specific preview image 921 is set to be low in proportion to a touch degree of the first input (e.g., ½, ¼, ⅛, . . . ). If a second input (e.g., a plurality of taps) are applied to another preview image 922, a play speed of the preview image 922 is set to be high in proportion to the number of times of the second input (e.g., 1.2 times, 1.8 times, 2 times, . . . ). Information on the changed play speed is visually displayed on each preview image (921a, 922a). Upon completion of edition, a video having a different play speed at each section is played.

Figure 10A:
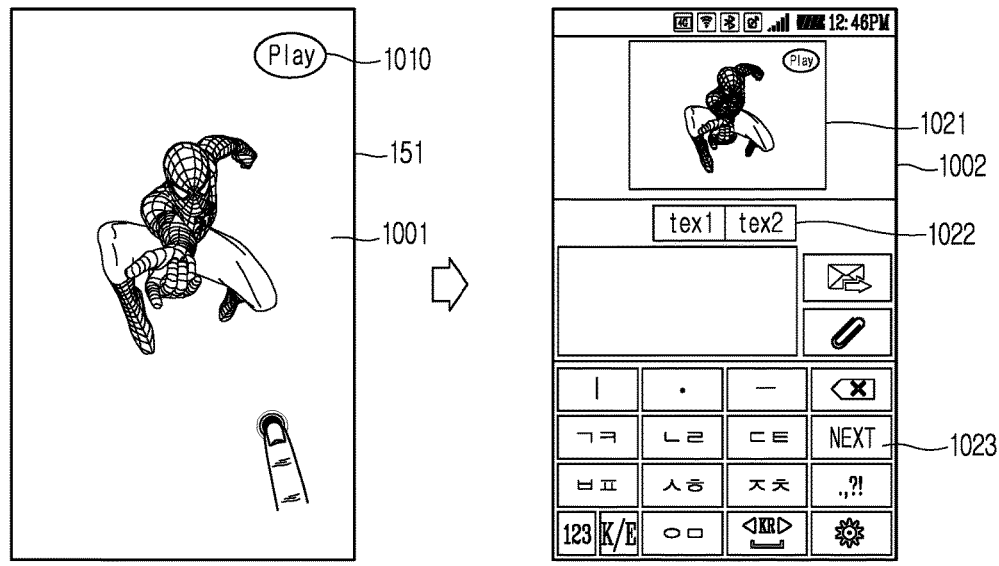
FIGS. 10A and 10B are views illustrating examples to execute a multi-tasking related to a video, based on a touch degree of a touch input, in a mobile terminal according to an embodiment of the present invention.
Figure 10B:
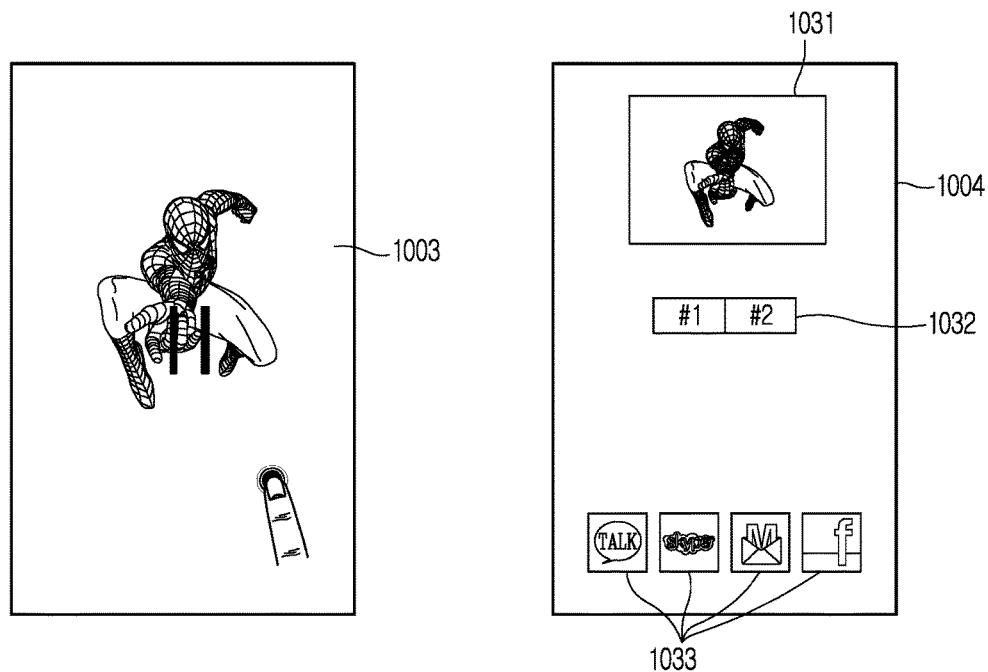

FIGS. 10A and 10B illustrate an operation of the mobile terminal when the aforementioned first touch input is applied to a video screen rather than a search bar. The controller 180 can execute a different task according to an operation state of a video screen displayed on the display unit 151 when a first touch input has been applied.

More specifically, as shown in FIG. 10A, while a video is being played (1010), if a touch degree of a first touch input applied to a video screen 1001 is changed, the controller 180 can enter an operation mode for executing a multi-tasking related to the video, while maintaining the play state of the video.

In the operation mode, a video play screen having a size determined based on the touch degree of the first touch input, may be attached to an execution screen of an application selected based on a preset reference (e.g., a user's frequently-used application, a lower layered application, etc.), e.g., a message sending screen. In this instance, the controller 180 can analyze the video play screen to extract a keyword, thereby attaching the keyword or determining a recipient to receive the video play screen.

As another example, as shown in FIG. 10B, in a temporary pause state of a video, if a touch degree of a first touch input applied to a stationary screen 1003 is changed, the controller 180 can capture the stationary screen 1003 and may provide an input screen 1004 for sharing a captured screen 1031.

The controller 180 can analyze the captured screen to generate tag information 1032, and may provide the generated tag information 1032 on the input screen 1004 such that relevant information may be searched conveniently. Once a user selects one of icons 1033 which corresponds to an application or a server to share the captured screen, the captured screen and the tag information are immediately uploaded. Upon completion of the uploading, the stationary screen 1003 may be re-output to the display unit 151.

The aforementioned embodiments may be extended to change a play speed at a plurality of play time points even when a video is being captured/recorded by using the mobile terminal 100.

Figure 11:
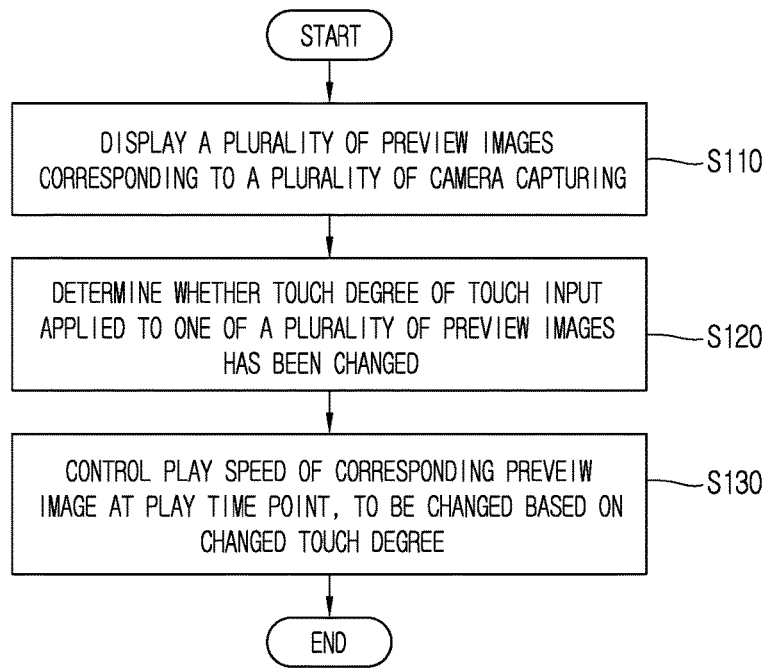
FIG. 11 is a flowchart illustrating a method of pre-changing a play speed of a video at a specific time point during a capturing operation using a camera, in a mobile terminal according to another embodiment of the present invention.

FIG. 11 is a flowchart illustrating a method of pre-changing a play speed of a video at a specific time point during a capturing operation using a camera, in a mobile terminal according to another embodiment of the present invention. Firstly, a plurality of preview images corresponding to a plurality of camera capturing are displayed on the display unit 151 of the mobile terminal 100 (S110). The plurality of preview images may be preview images captured by the camera of the mobile terminal 100 (e.g., a front camera, a rear camera, a general angle camera, a wide angle camera, etc.). Alternatively, the plurality of preview images may be preview images received from another mobile terminal connected to the mobile terminal 100 through the interface unit 160 or the wireless communication unit 110.

Then, the controller 180 determines whether touch information of a touch input applied to one of the plurality of preview images is changed, during the camera capturing (S120). And the controller 180 changes a play speed of the preview image at a corresponding play time point, according to a changed touch degree (S130).

Figure 12:
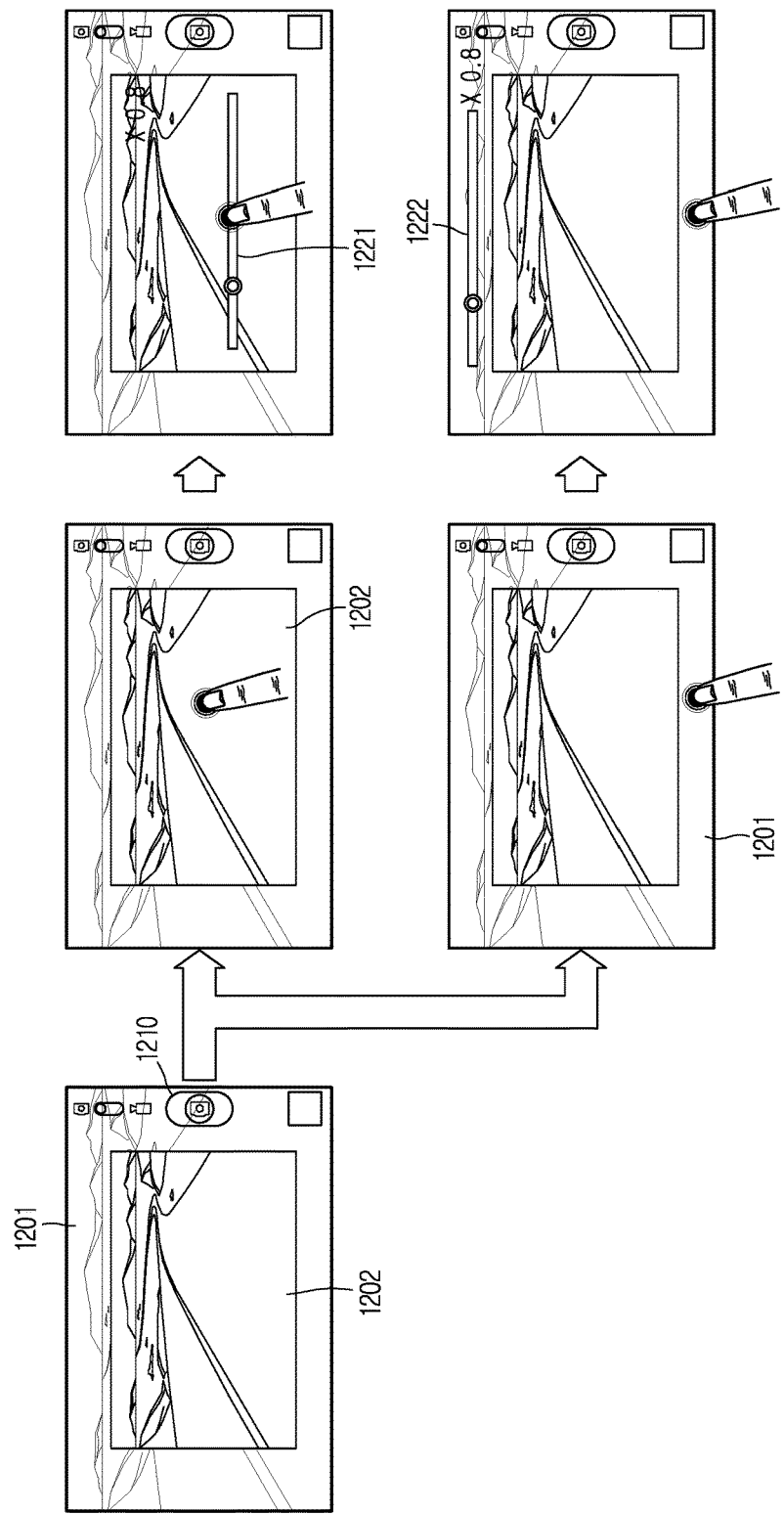
FIGS. 12 to 14 are views illustrating various examples related to the method of FIG. 11.

More specifically, as an example to capture images using a plurality of cameras, referring to FIG. 12, a first preview image 1202 corresponding to a general angle capturing, and a second preview image 1201 corresponding to a wide angle capturing, may be together displayed on the display unit 151.

After a capturing signal is applied through a capturing button 1210, if a touch input having a pressure exceeding a reference pressure is applied to the first preview image 1202 or the second preview image 1201, displayed is an indicator 1221 or 1222 indicating a change degree of a play speed of the corresponding preview image at a capturing time point.

If the indicator 1221 or 1222 is scrolled according to a change degree of the touch input, the controller 180 changes the play speed of the corresponding preview image at the capturing time point. In this instance, the first preview image 1202 and the second preview image 1201 maintain the same capturing speed regardless of a touch region of the touch input. That is, in case of playing a video after the capturing is terminated, the play speed is changed at a section corresponding to a time point when the touch input has been applied (e.g., 0.8 times).

Figure 13:
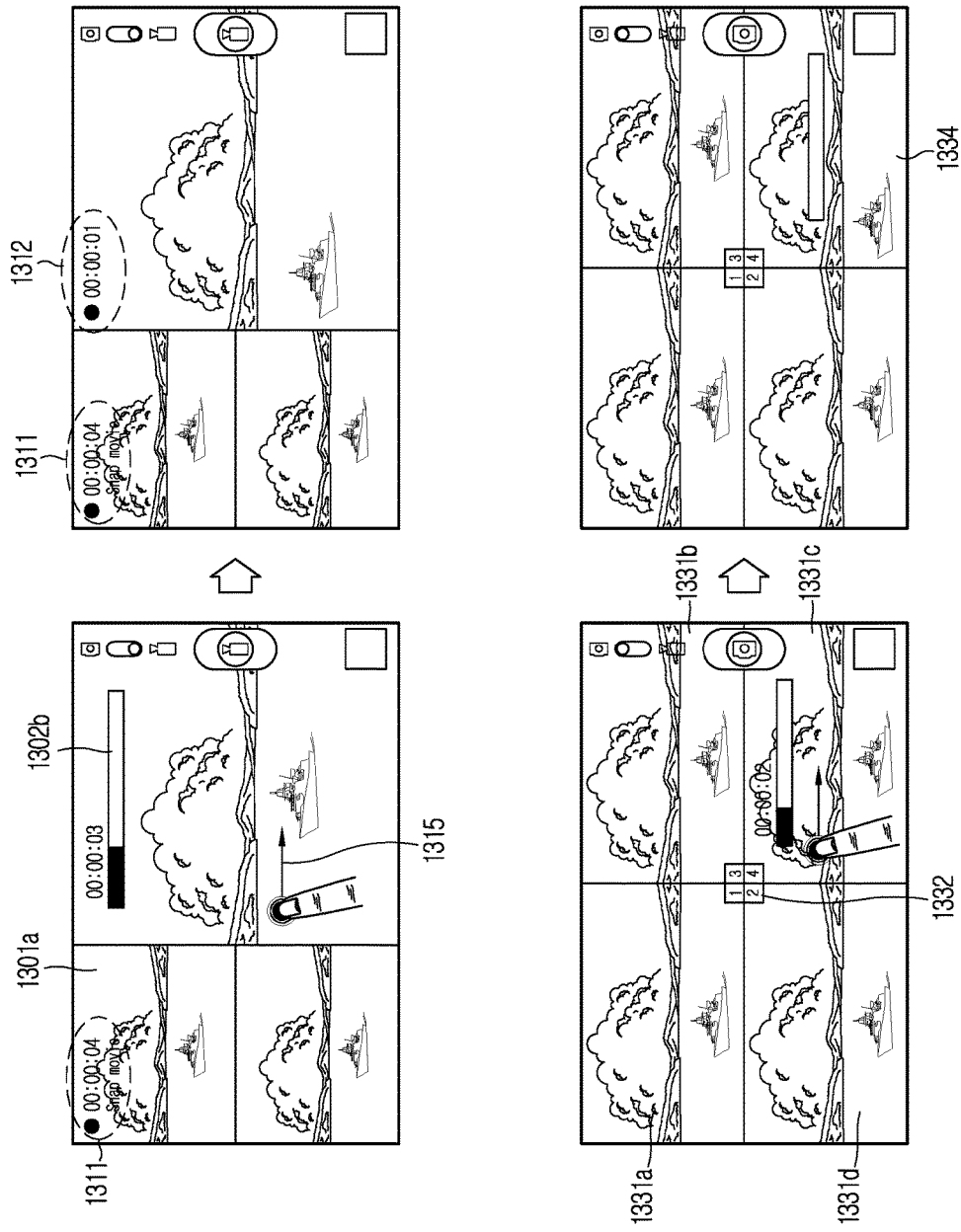

As another example, as shown in the upper drawings of FIG. 13, in case of capturing a video using a plurality of cameras, if a touch input applied to at least one preview image 1315 is dragged in one direction while or before a video is captured, the controller 180 can control a capturing time point of the corresponding preview image to be different from that of other preview images.

For instance, if a touch input having a pressure exceeding a reference pressure and applied to a preview image displayed on a specific region is dragged to the right side (1315), displayed is an indicator bar 1302b indicating a capturing time point controlled based on a dragged degree.

As a result, the preview image is captured at a time point later than that of other preview images by 3 seconds, for instance. This may be applicable to a case where a plurality of images are captured, as shown in the lower drawings of FIG. 13.

Figure 14:
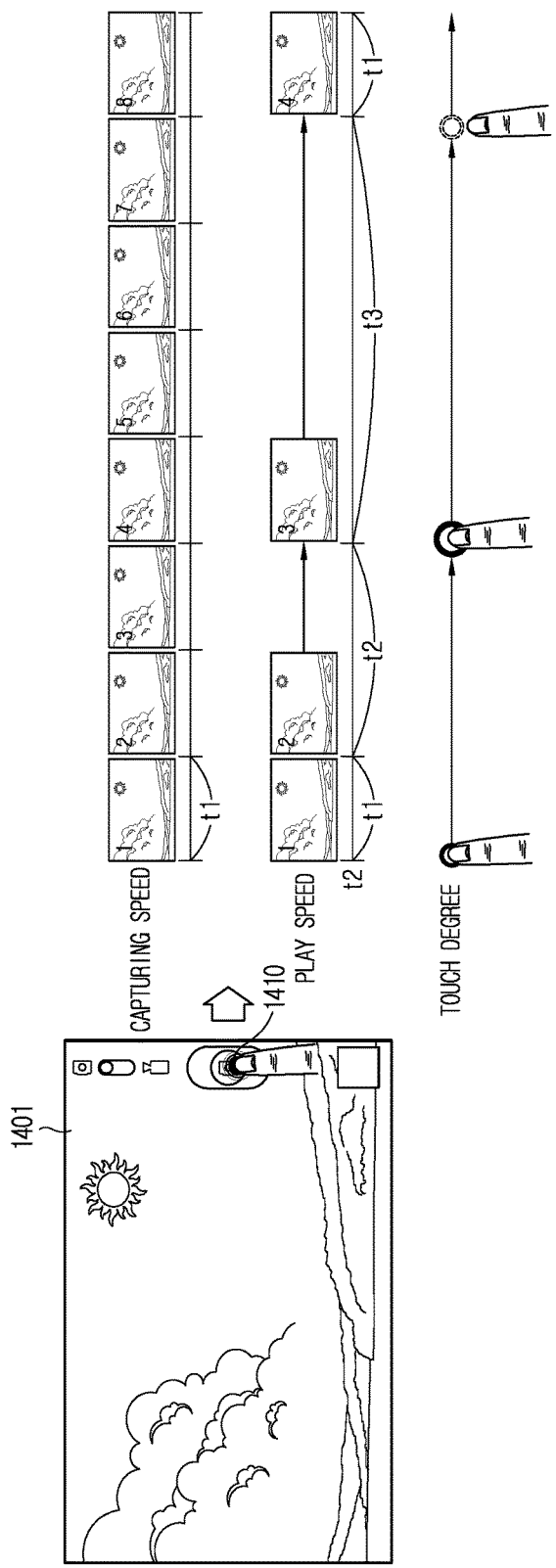

FIG. 14 illustrates a case of capturing an image using a bust shot function of the camera 121 of the mobile terminal 100. After a capturing is started as an input is applied to a capturing button 1410, if a touch input having a pressure exceeding a reference pressure is applied to any point on a preview image 1401 during a bust shot operation, a capturing speed of the bust shot operation is maintained, and a play speed is controlled after the capturing is terminated in proportion to a touch degree of the touch input. In this instance, although not shown, an icon indicating a change degree (t1, t2, t3, t4) of the play speed during the bust shot operation may be output to one region of the display unit 151.

The controller 180 can immediately change a play speed at a current play time point, as a drag input/a flicking input is applied right and left when a touch input having a pressure exceeding a reference pressure has been applied to a display region of a video screen. If the video screen is in a temporary pause state, the controller 180 can jump to a specific play time point by other operation. Here, the specific play time point may be a play time point including a specific scene (e.g., a main scene, etc.) or a play time point including a specific person or voice, according to an analysis result of meta data and audio data of a video.

As aforementioned, in the present invention, while a video is being played, a user can rapidly search a desired scene, by checking scenes corresponding to a plurality of play time points at a time, using a touch input applied to a search bar. Further, a play speed corresponding to a specific play time point/section or play speeds corresponding to a plurality of play time points/sections are pre-controlled while a video is being played. This may enhance a user's convenience.

Various embodiments may be implemented using a machine-readable medium having instructions stored thereon for execution by a processor to perform various methods presented herein. Examples of possible machine-readable mediums include HDD (Hard Disk Drive), SSD (Solid State Disk), SDD (Silicon Disk Drive), ROM, RAM, CD-ROM, a magnetic tape, a floppy disk, an optical data storage device, the other types of storage mediums presented herein, and combinations thereof. If desired, the machine-readable medium may be realized in the form of a carrier wave (for example, a transmission over the Internet). The processor may include the controller 180 of the mobile terminal. Therefore, it should also be understood that the above-described embodiments are not limited by any of the details of the foregoing description, unless otherwise specified, but rather should be construed broadly within its scope as defined in the appended claims, and therefore all changes and modifications that fall within the metes and bounds of the claims, or equivalents of such metes and bounds are therefore intended to be embraced by the appended claims.

What is claimed is:

1. A mobile terminal, comprising:
 a wireless processor configured to provide wireless communication;
 a touch screen; and
 a controller configured to:
 display a search bar on the touch screen for searching a video and a specific time point of the video, in response to a first touch input at a touch region of the search bar, display a first preview image at a play time point corresponding to the touch region of the search bar, convert the first preview image into a first plurality of preview images at a plurality of play time points in response to a changed touch degree of the first touch input while playing the video, wherein the first plurality of preview images are composed of the first preview image and other preview images at play time points before and after the play time point of the first preview image, in response to a second touch input being consecutively applied to the search bar when the first plurality of preview images are displayed, change a play speed of at least part of the first plurality of preview images at a play time point while maintaining play of the video, display information related to the changed play speed on the touch screen, and in response to a touch input applied to a specific preview image among the plurality of first preview images, play a video at a play time point corresponding to the specific preview image at the changed play speed.

2. The mobile terminal of claim 1, wherein the controller is further configured to determine a number of the first plurality of preview images at the plurality of play time points in proportion to a touch degree of the first touch input.

3. The mobile terminal of claim 1, wherein the controller is further configured to select the plurality of play time points based on the play time point corresponding to the touch region of the first touch input.

4. The mobile terminal of claim 3, wherein the controller is further configured to differently control a time interval among the plurality of play time points, according to the touch degree of the first touch input.

5. The mobile terminal of claim 1, wherein in response to the touch degree of the first touch input being changed, the controller is further configured to:
convert the first preview image at the play time point into a second preview image, and
display a second plurality of preview images at a plurality of play time points based on the second preview image, based on a drag degree of a drag touch input subsequently applied to the search bar.

6. The mobile terminal of claim 1, wherein in response to a plurality of taps being applied to the search bar as the second touch input, the controller is further configured to change the play speed at a plurality of play time points corresponding to touch regions of the plurality of taps, to be higher than a set speed.

7. The mobile terminal of claim 1, wherein in response to a touch input having a pressure exceeding a reference pressure being applied to the search bar as the second touch input, the controller is further configured to change the play speed at a play time point corresponding to the touch region of the touch input, to be lower than a set speed.

8. The mobile terminal of claim 1, wherein in response to the play speed at a specific play time point being changed according to the second touch input, the controller is further configured to change the first preview image at the specific play time point, into an image corresponding to the changed play speed.

9. The mobile terminal of claim 1, wherein in response to the play speed at a specific play time point being changed according to the second touch input, the controller is further configured to display a graphic object indicating the change of the play speed at the specific play time point above a preview image corresponding to the specific play time point.

10. The mobile terminal of claim 9, wherein the controller is further configured to:
display information on the changed play speed on the graphic object, and
display the graphic object by depending on a display state of the preview image corresponding to the specific play time point.

11. The mobile terminal of claim 10, wherein in response to the second touch input applied to the search bar being dragged in one direction in the displayed state of the graphic object, the controller is further configured to convert the play speed of neighboring preview images, into the play speed displayed on the graphic object.

12. The mobile terminal of claim 10, wherein in response to a touch input having a pressure exceeding a reference pressure being applied to the graphic object, the controller is further configured to convert the play speed of a video output to the touch screen, into the play speed displayed on the graphic object.

13. The mobile terminal of claim 10, wherein in response to a preset touch gesture being applied to the graphic object, the controller is further configured to display preview images from the first plurality of preview images at play time points having the same play speed as the graphic object, in an assembled manner.

14. The mobile terminal of claim 1, wherein in response to a touch degree of the first touch input applied to the search bar being changed in a pause state of the video, the controller is further configured to:
execute an edition mode for editing the video, and
convert the video into the preview images from the plurality of first preview images at the plurality of play time points.

15. The mobile terminal of claim 14, wherein in response to a subsequent touch input having a pressure exceeding a reference pressure being applied to one of the preview images at the plurality of play time points in the edition mode, the controller is further configured to convert each of the preview images from the first plurality of preview images into a plurality of sub preview images.

16. The mobile terminal of claim 1, wherein in response to the first touch input being applied to an output region of the video, and if the touch degree of the first touch input is changed, the controller is further configured to enter an operation mode for executing a multi-tasking operation related to the video, while maintaining the output state of the video.

17. A method of controlling a mobile terminal, the method comprising:
displaying a search bar on a touch screen of the mobile terminal for searching a video and a specific time point of the video;
in response to a first touch input at a touch region of the search bar, displaying a first preview image at a play time point corresponding to the touch region of the search bar;
converting, via a controller of the mobile terminal, the first preview image into a first plurality of preview images at a plurality of play time points in response to a changed touch degree of the first touch input while playing the video, wherein the first plurality of preview images are composed of the first preview image and other preview images at play time points before and after the play time point of the first preview image;

in response to a second touch input being consecutively applied to the search bar when the first plurality of preview images are displayed, changing, via the controller, a play speed of at least one of the first plurality of preview images at a play time point while maintaining play of the video;

displaying information related to the changed play speed on the touch screen; and in response to a touch input applied to a specific preview image among the first plurality of preview images, playing a video at a play time point corresponding to the specific preview at the changed play speed.

18. The method of claim 17, further comprising:

determining, via the controller, a number of the first plurality of preview images at the plurality of play time points in proportion to a touch degree of the first touch input.

* * * * *